Feb. 25, 1941. G. C. PAXTON 2,232,725
METHOD AND MACHINE FOR STRAPPING BOXES
Filed July 26, 1938 15 Sheets-Sheet 1

INVENTOR
GERALD C. PAXTON
BY
ATTORNEY

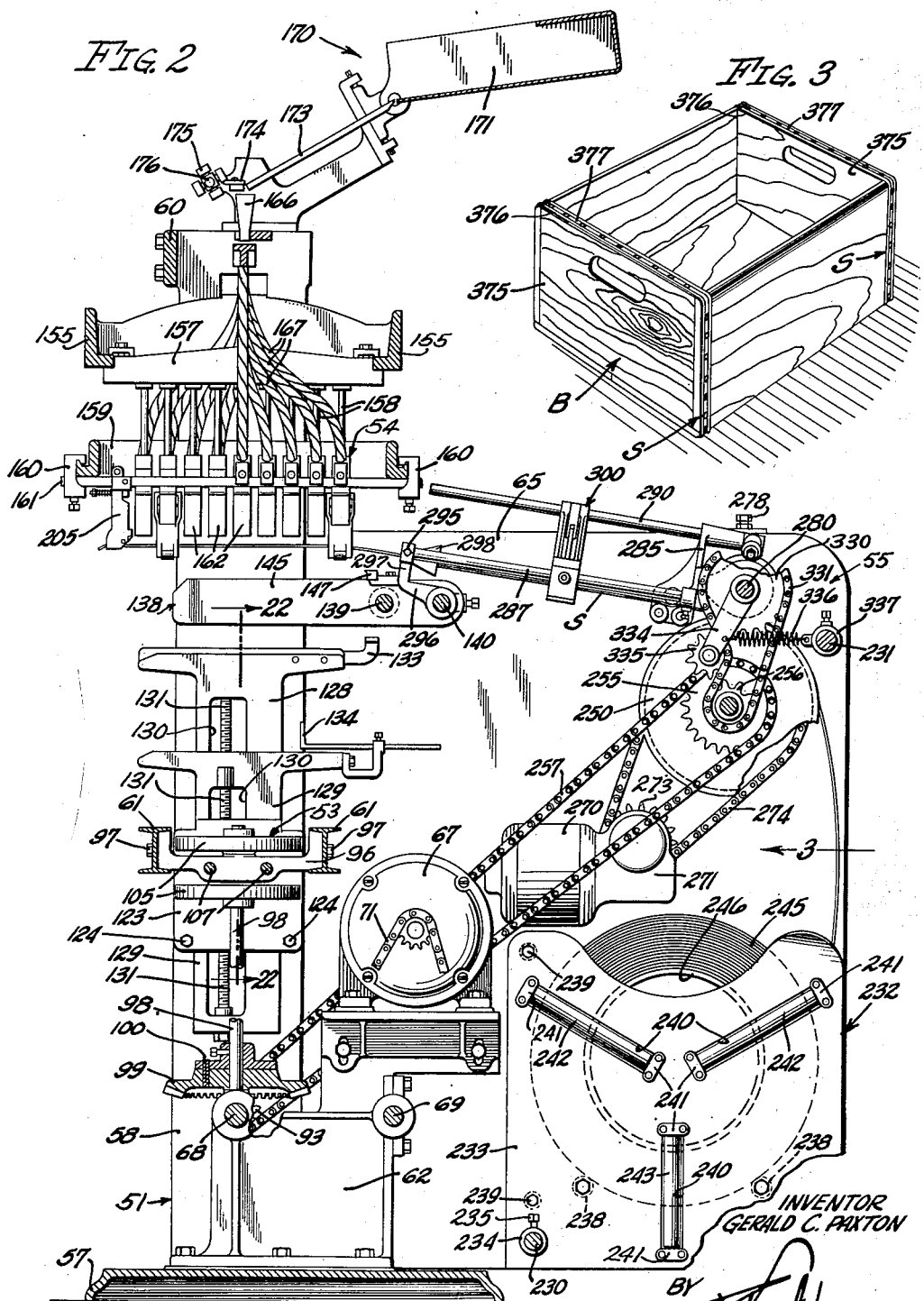

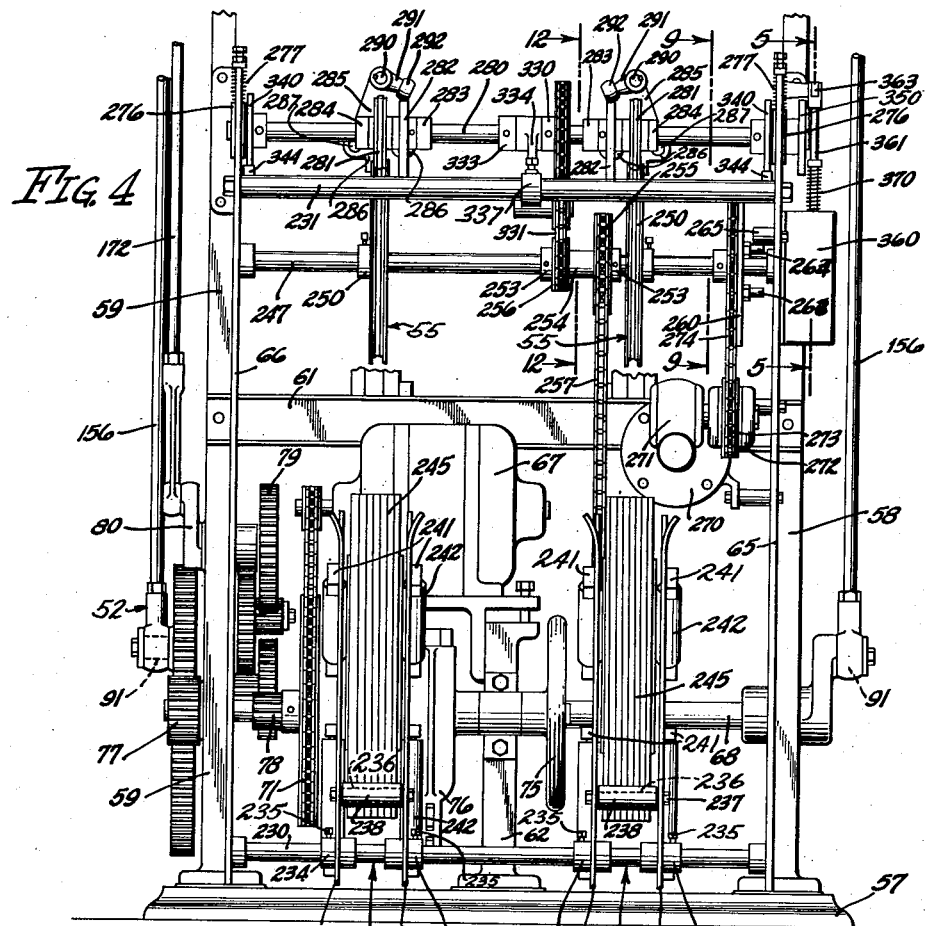
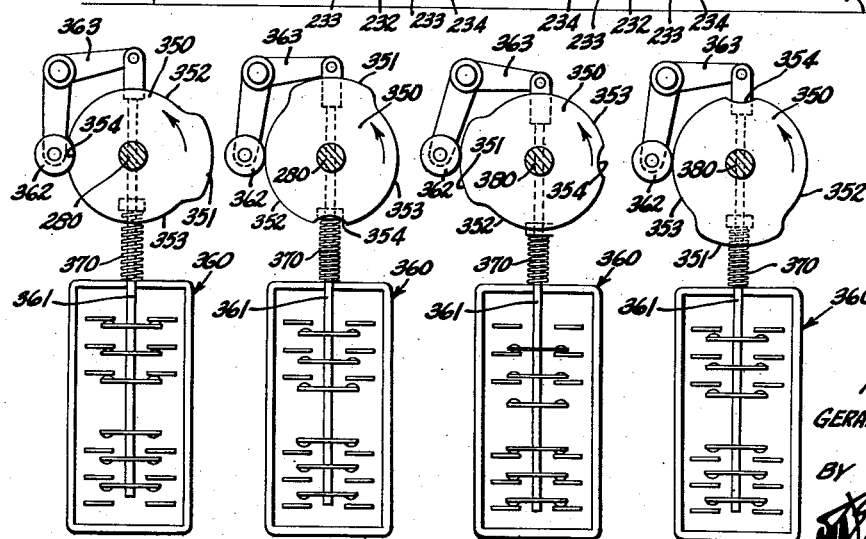
FORWARD
FIG. 5
STOPPED
FIG. 6
REVERSE
FIG. 7
STOPPED
FIG. 8

Feb. 25, 1941.  G. C. PAXTON  2,232,725
METHOD AND MACHINE FOR STRAPPING BOXES
Filed July 26, 1938  15 Sheets-Sheet 4
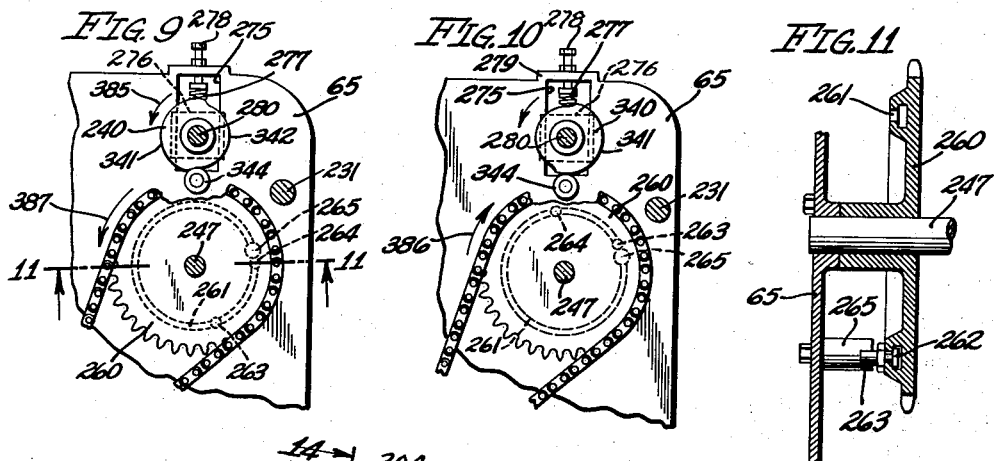
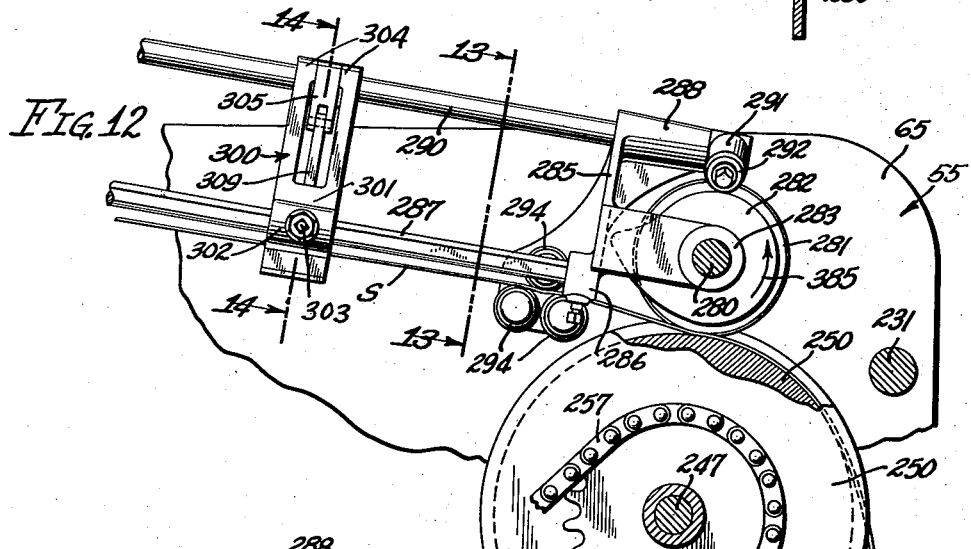
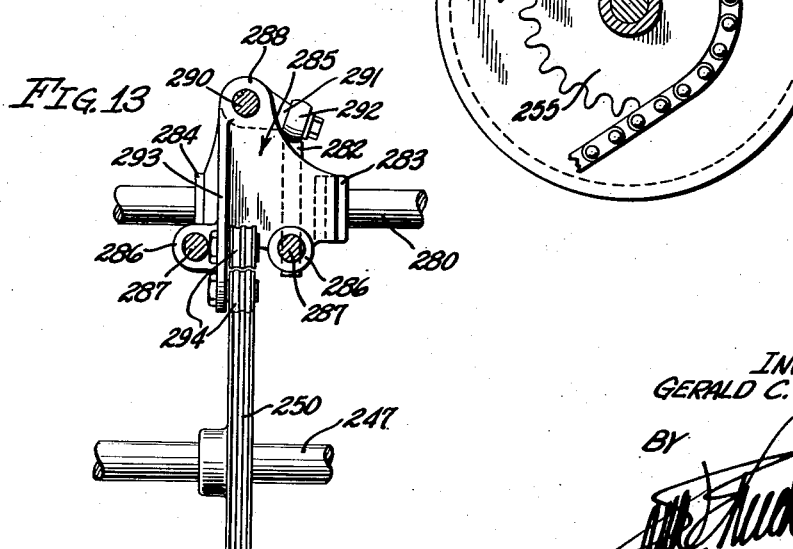
INVENTOR
GERALD C. PAXTON
BY
ATTORNEY

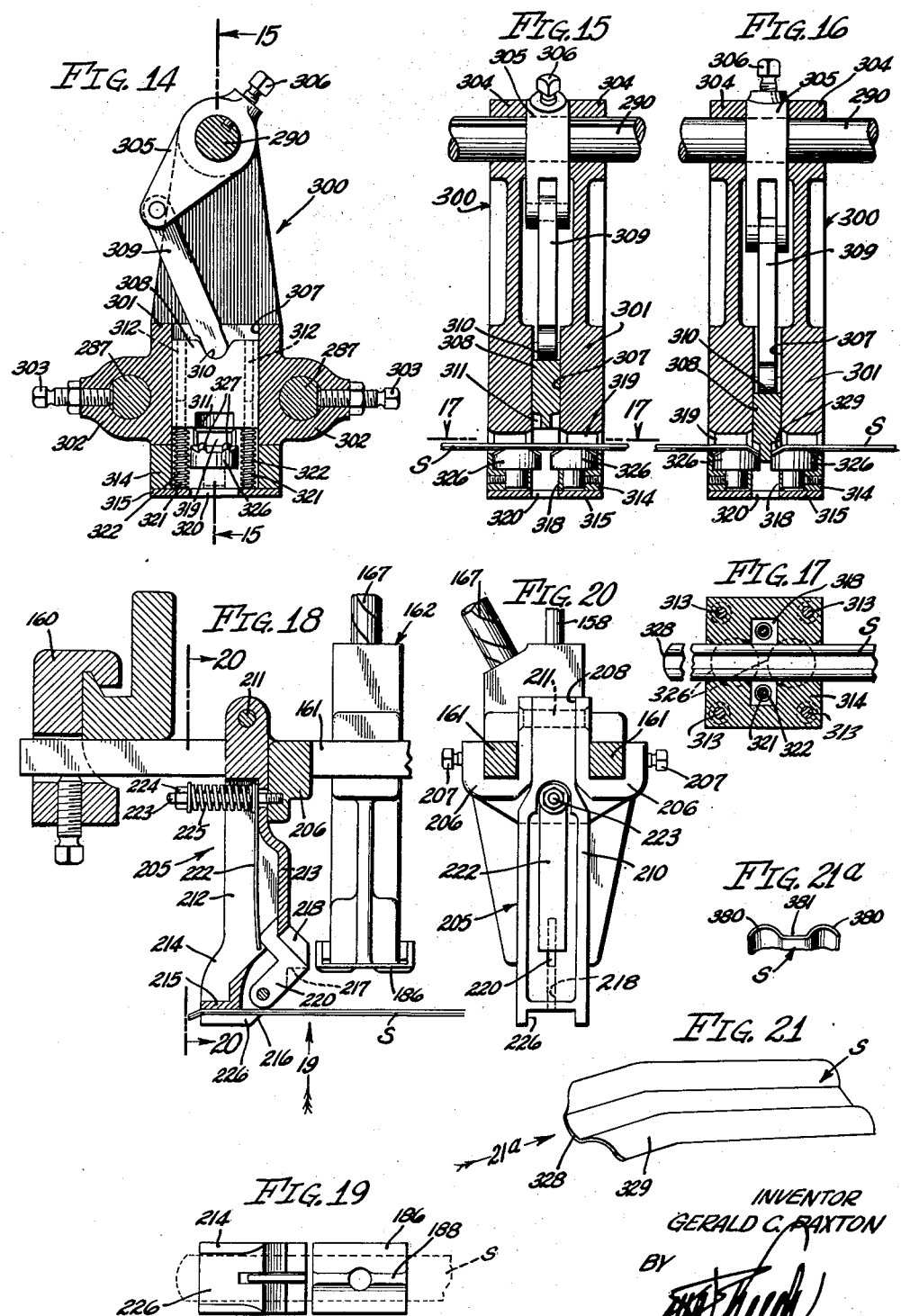

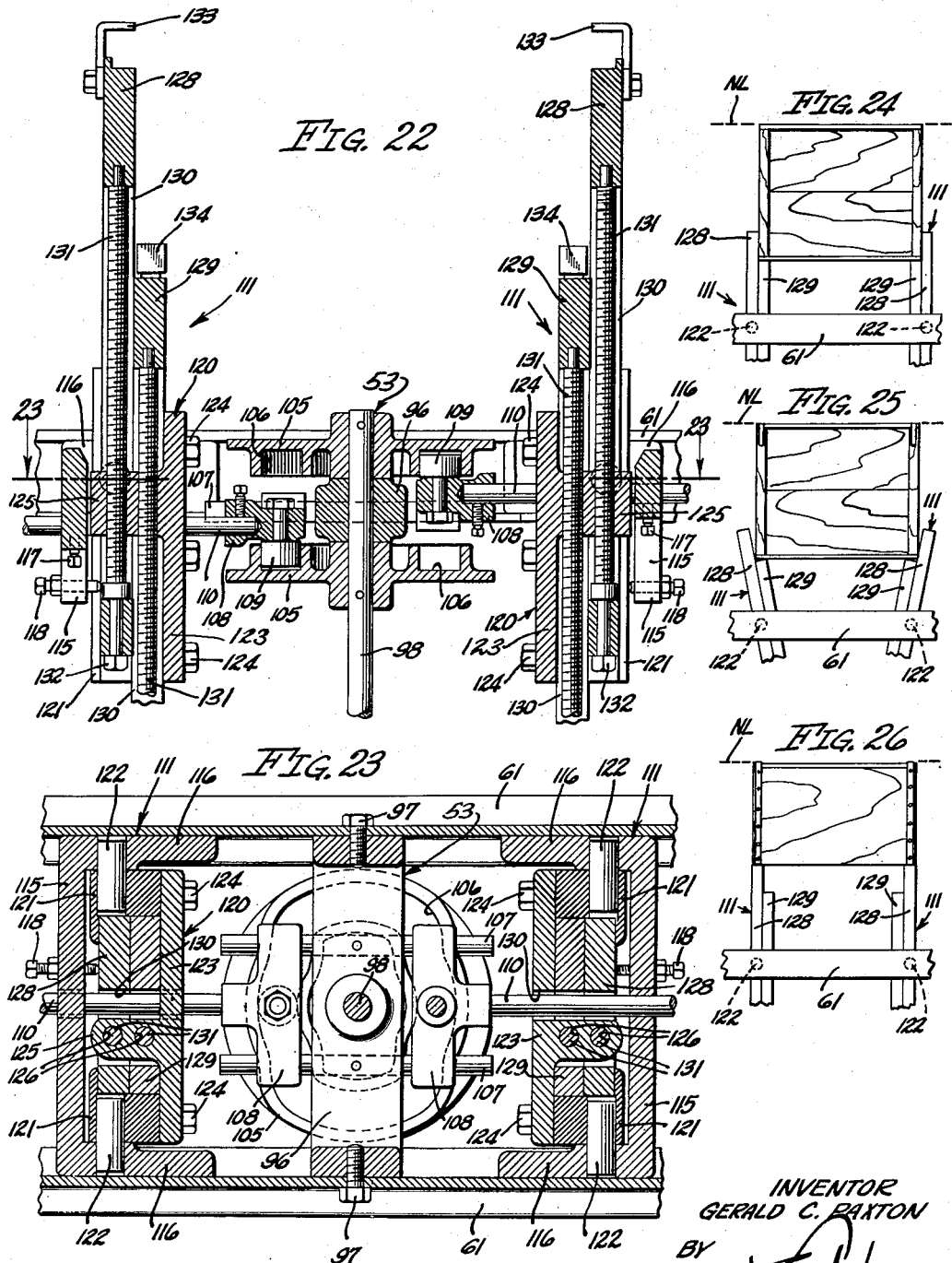

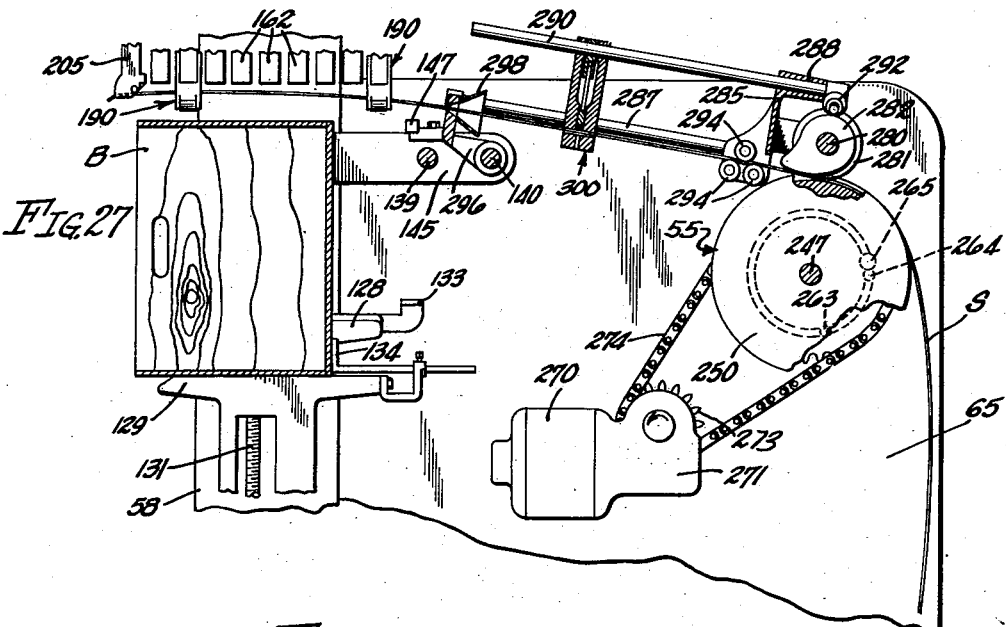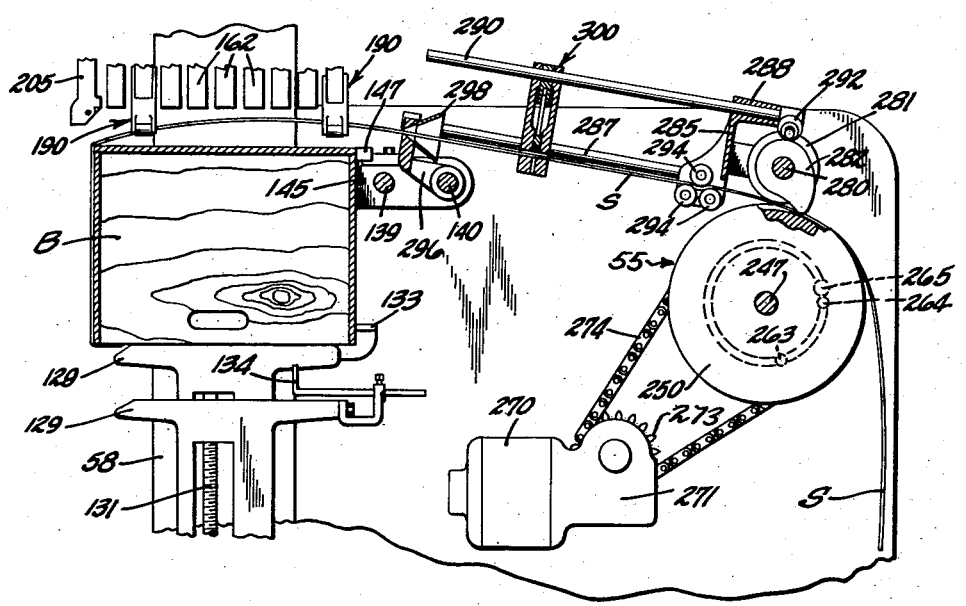

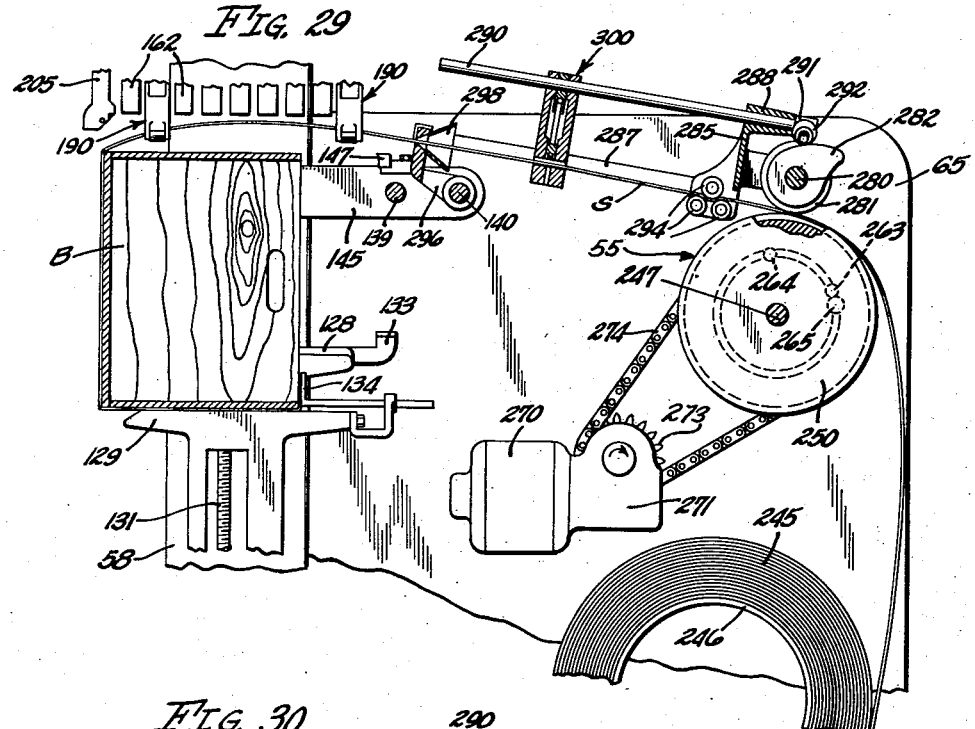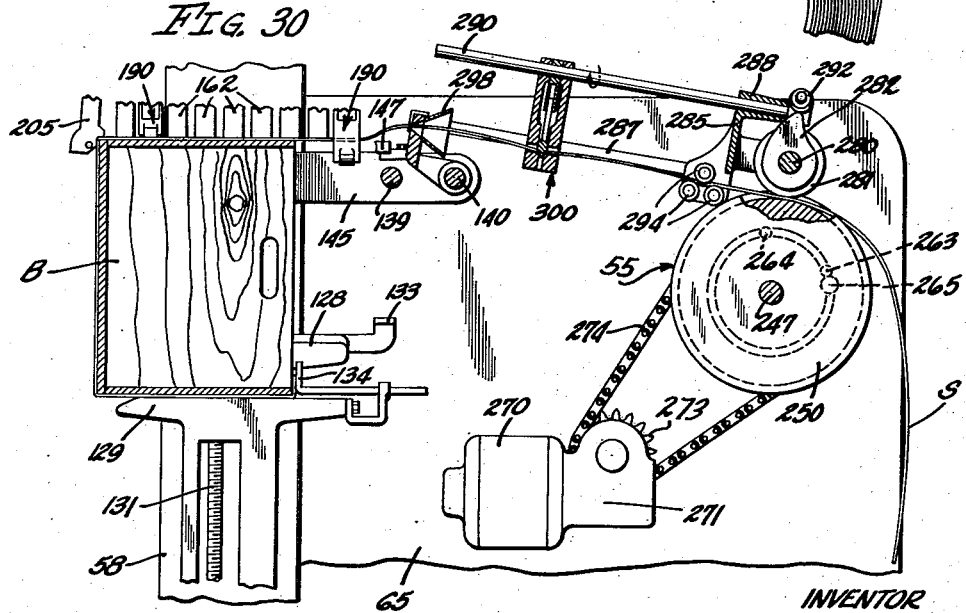

Feb. 25, 1941.　　　G. C. PAXTON　　　2,232,725
METHOD AND MACHINE FOR STRAPPING BOXES
Filed July 26, 1938　　　15 Sheets-Sheet 9
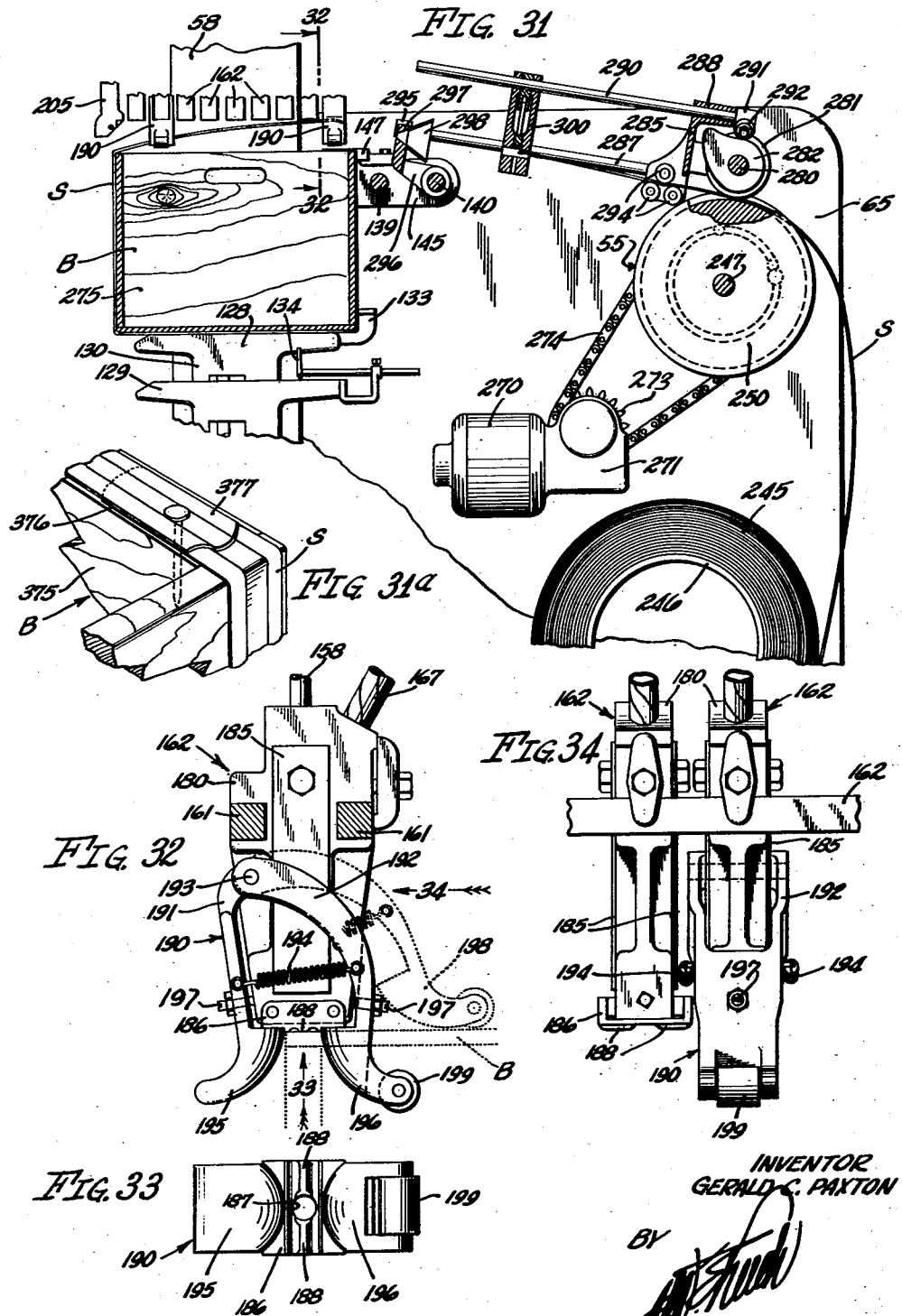

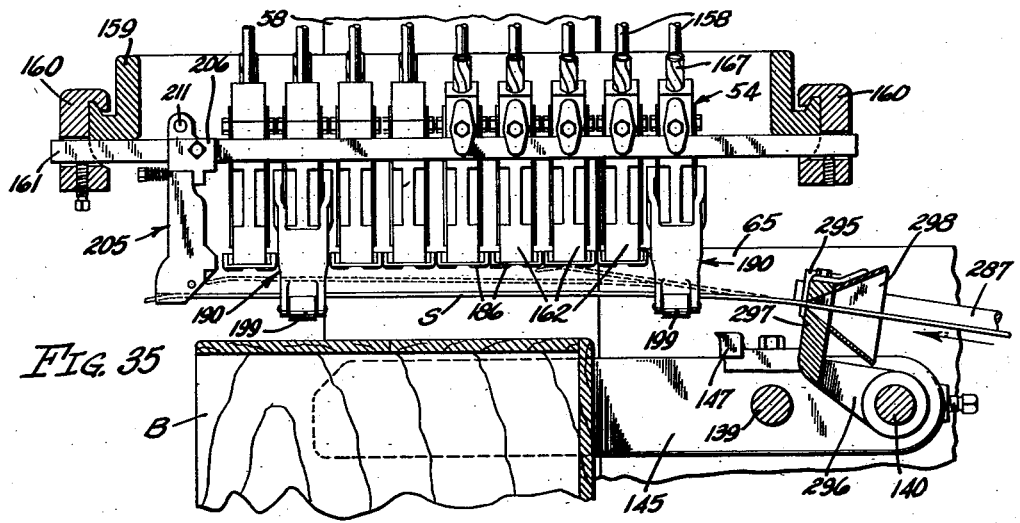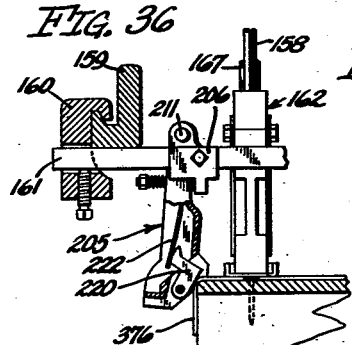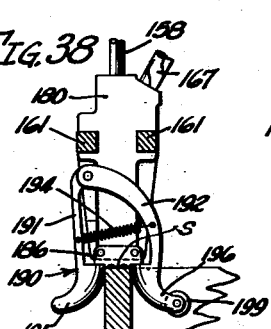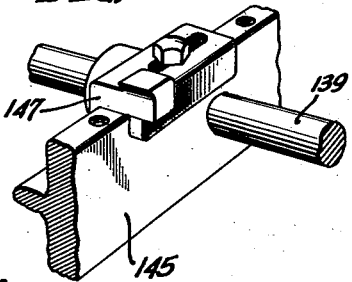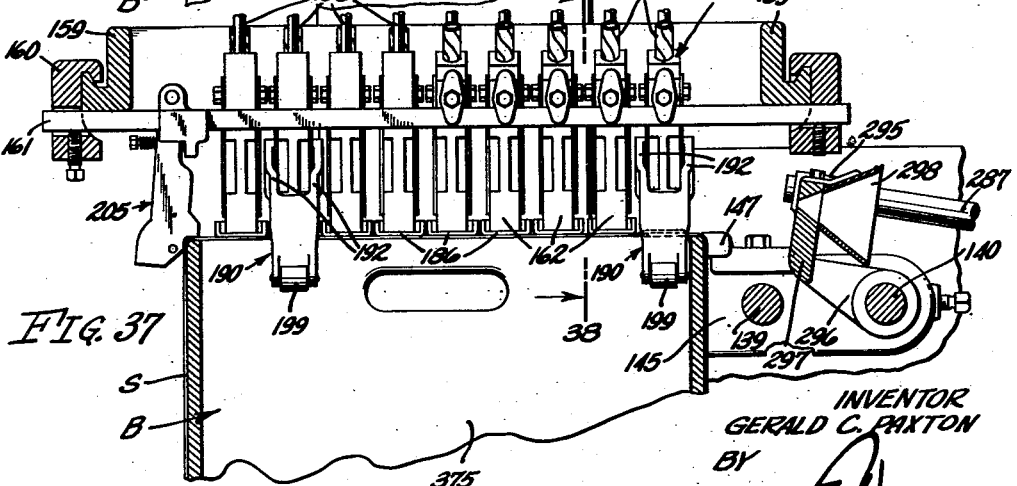

Feb. 25, 1941.  G. C. PAXTON  2,232,725
METHOD AND MACHINE FOR STRAPPING BOXES
Filed July 26, 1938  15 Sheets-Sheet 11
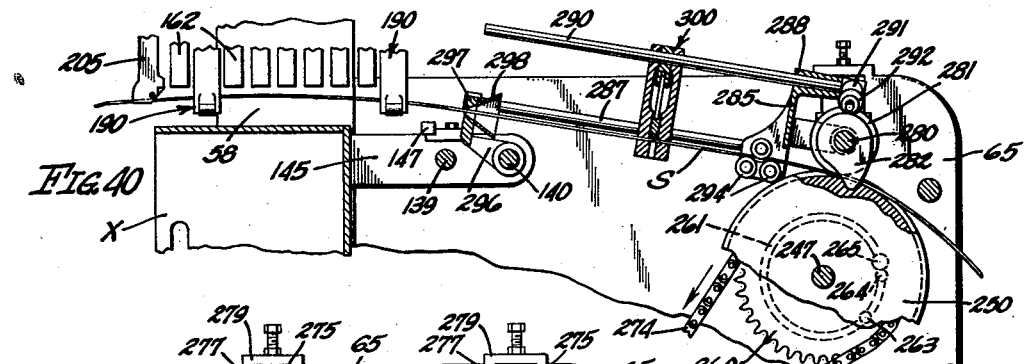
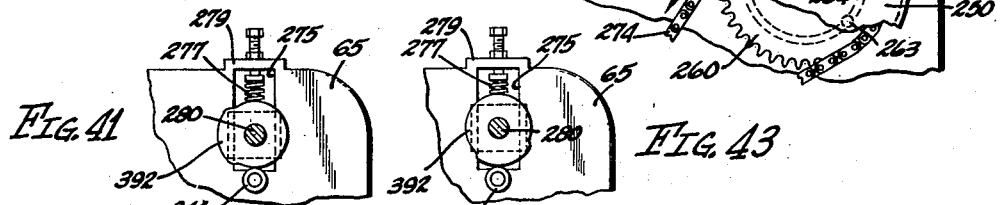
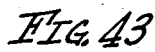
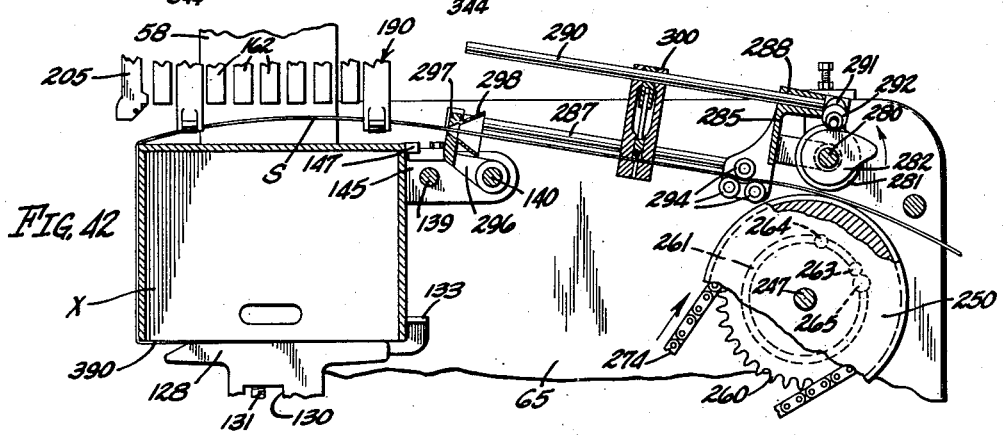
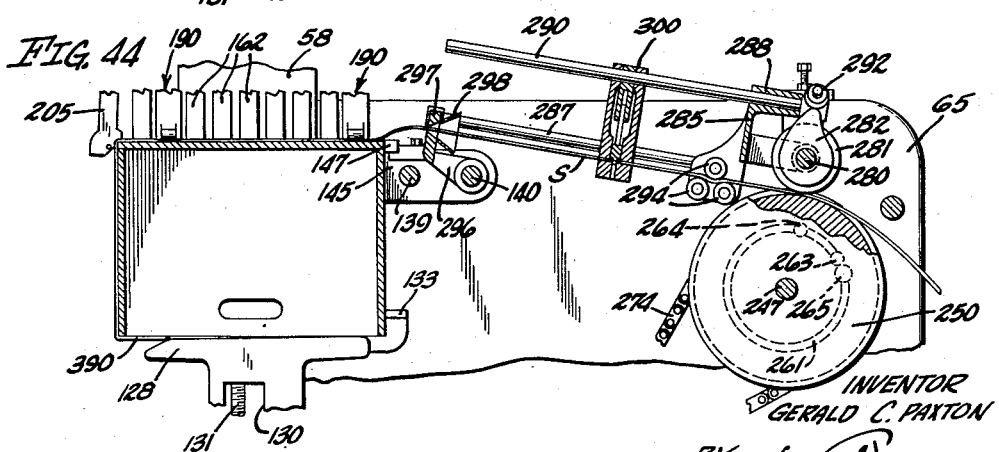
INVENTOR
GERALD C. PAXTON
BY
ATTORNEY Feb. 25, 1941.   G. C. PAXTON   2,232,725
METHOD AND MACHINE FOR STRAPPING BOXES
Filed July 26, 1938   15 Sheets-Sheet 12
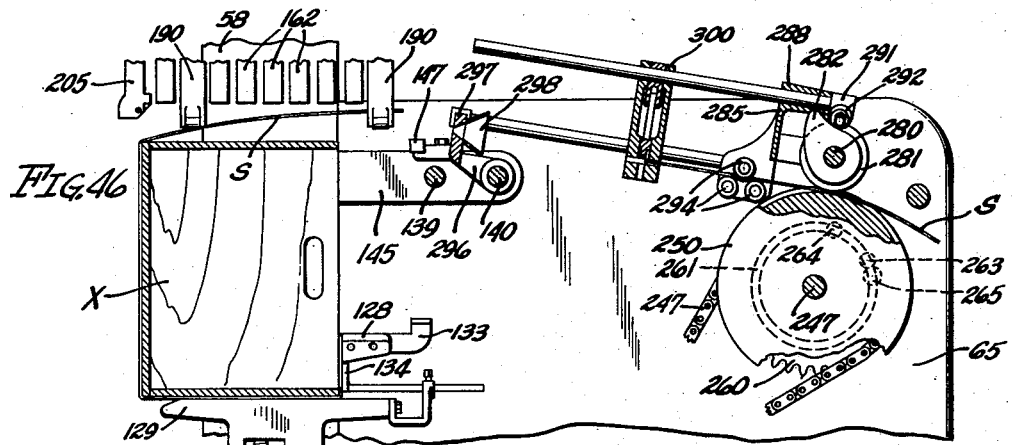
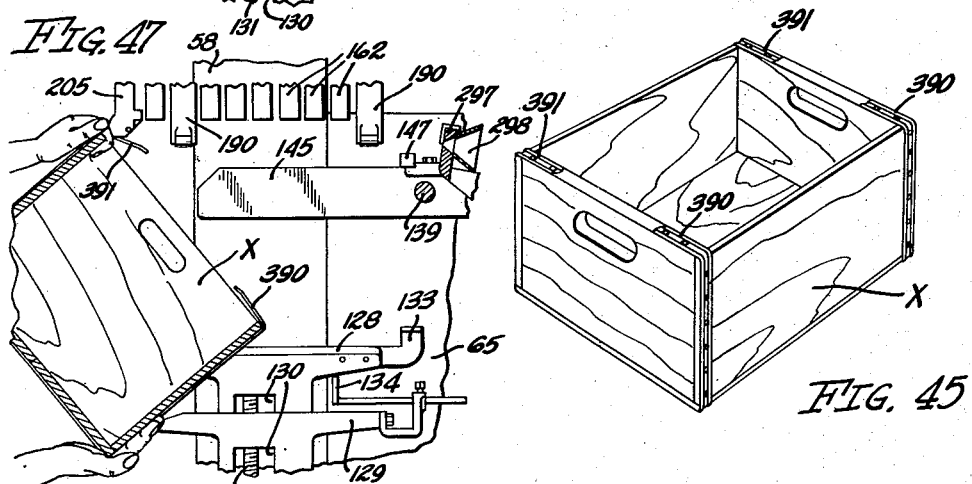
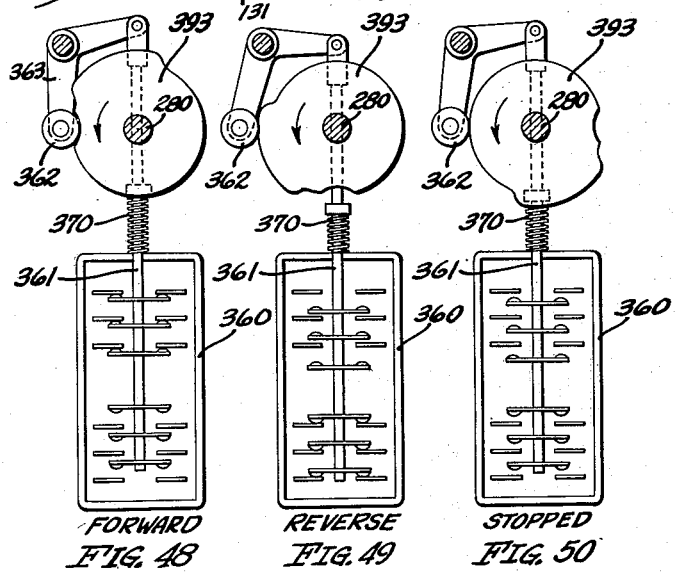
INVENTOR
GERALD C. PAXTON
BY
ATTORNEY

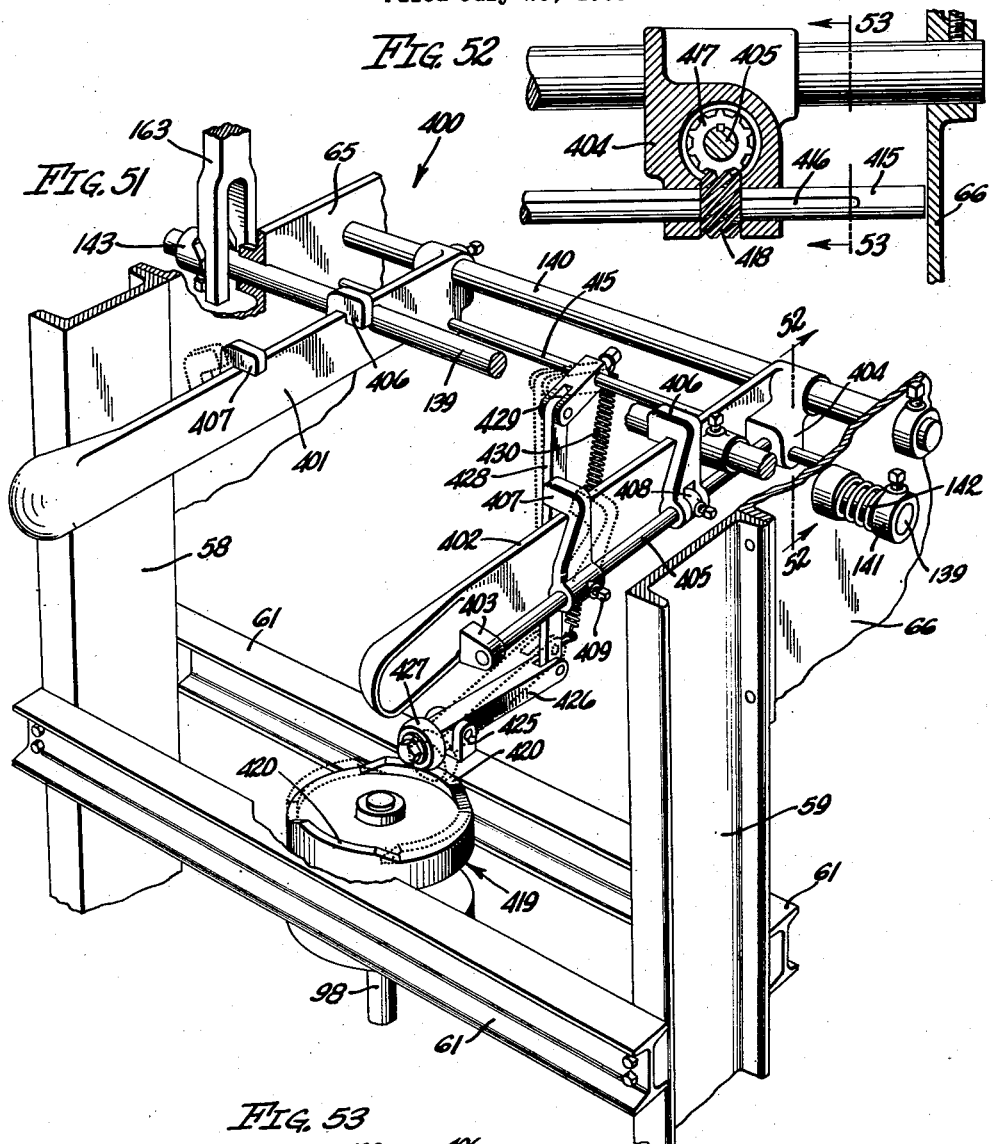

Feb. 25, 1941.                G. C. PAXTON                2,232,725
               METHOD AND MACHINE FOR STRAPPING BOXES
                  Filed July 26, 1938       15 Sheets-Sheet 14
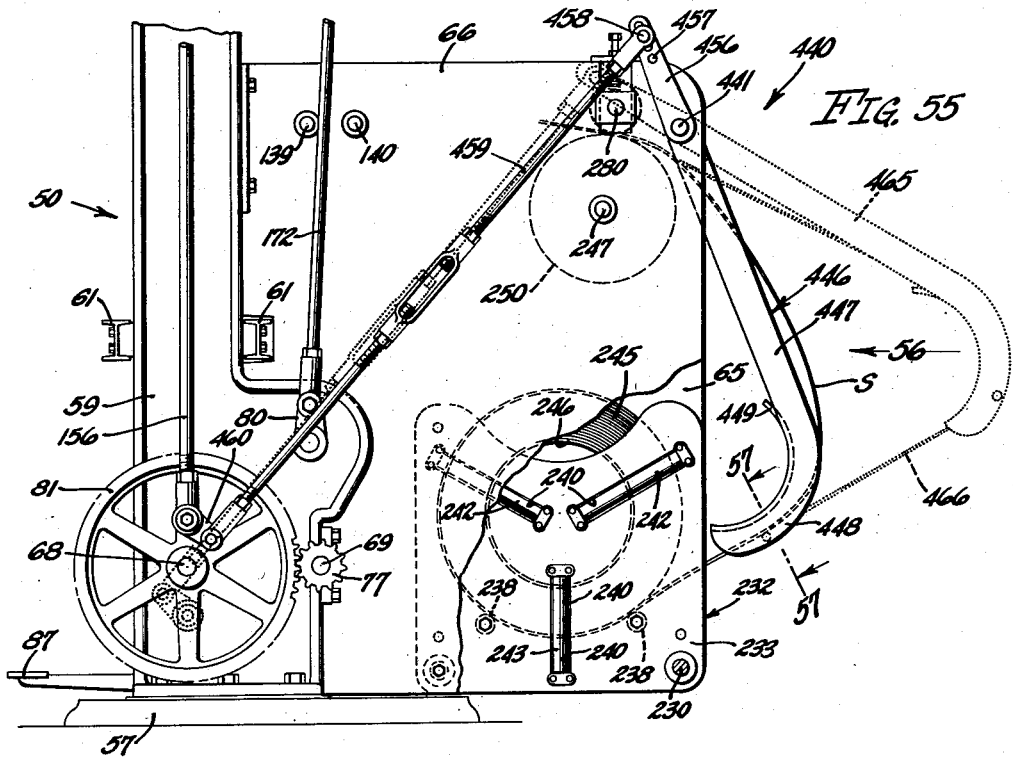
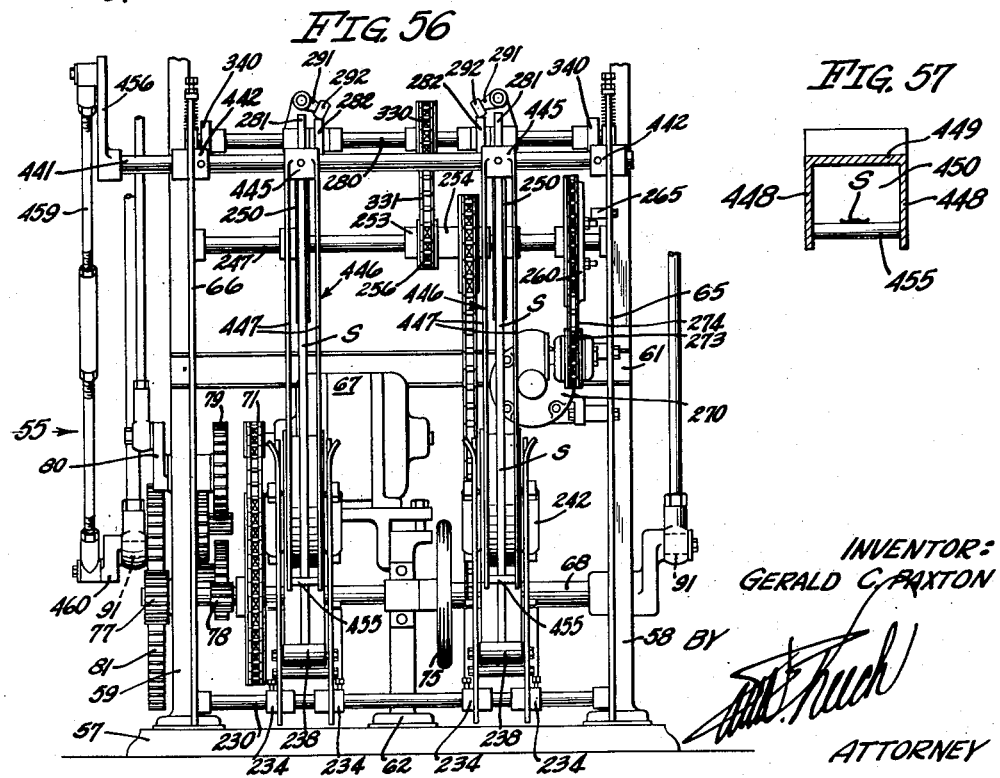
INVENTOR:
GERALD C. PAXTON
ATTORNEY

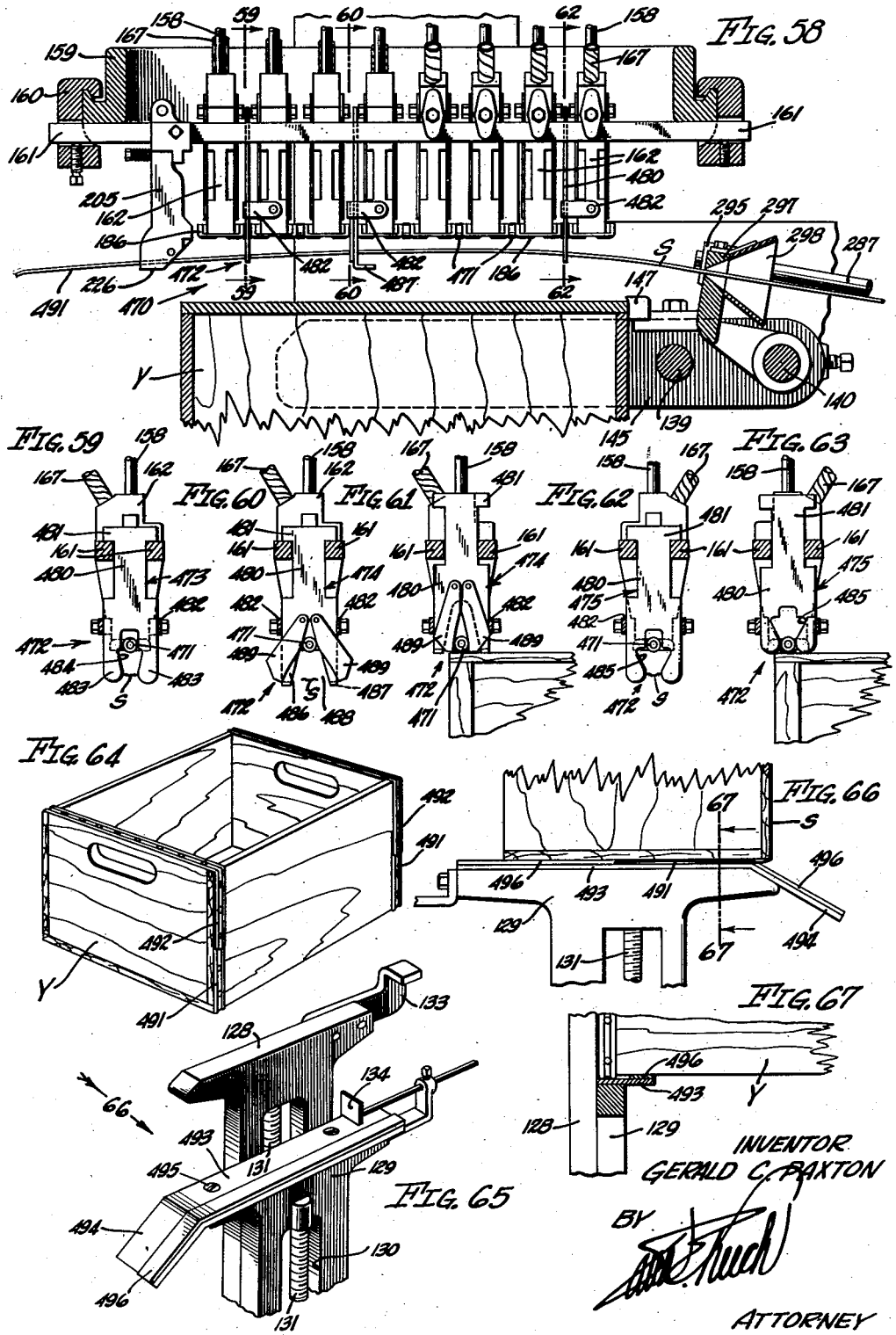

Patented Feb. 25, 1941

2,232,725

UNITED STATES PATENT OFFICE 2,232,725

METHOD AND MACHINE FOR STRAPPING BOXES

Gerald C. Paxton, Santa Ana, Calif., assignor to Food Machinery Corporation, San Jose, Calif., a corporation of Delaware Application July 26, 1938, Serial No. 221,344

50 Claims. (Cl. 1—10)

This invention relates to the art of strapping boxes and is particularly useful in binding the ends of boxes with strapping material.

It is a particular object of my invention to provide a novel method of and machine for strapping boxes by which a faster production of boxes with metal bound ends may be accomplished.

In the prior art, the operators of machines for strapping the ends of boxes had to pull strap material into the machine between the nailing devices and the ends of the box. This, of course, consumed a considerable portion of the time of the operator in strapping boxes.

It is an object of my invention to provide a novel method of and machine for strapping the ends of boxes which will eliminate the need for the operator pulling the strap into the machine.

Another object is to accomplish automatically the shaping of the underlapping strap ends over the foremost corners of the box in the first nailing operation.

It is a further object of my invention to provide a novel method of and machine for strapping boxes in which the strap feeding means is controllable to predetermine the amount of strap material contained in said underlapping portions.

Yet another object of my invention is to provide a novel method of and machine for strapping boxes in which the strap is fed from continuous lengths thereof and automatically cut so as to permit the operator to predetermine the amount of strap material contained in overlapping portions of the strap material.

It is also an object of my invention to provide a novel method of and a machine for strapping boxes in which the underlap and overlap portions of strap material which are nailed down to the box in the final nailing operation are automatically maintained substantially flush with the box ends during the nailing operation.

Yet another object of my invention is to provide a method of and machine for strapping boxes in which a strap is automatically shaped to closely fit the corners of the boxes whether the latter be rounded or square.

Another object of my invention is to provide a novel method of and machine for strapping ends of boxes which is adapted for use in the rapid manufacture of metal bound boxes differing in size.

Yet another object of my invention is to provide a strapping machine in which the strap is automatically cut incidental to a nailing operation which precedes one or more following nailing operations in which the loose portions of strap material are then nailed to the box.

A still further object is to provide a novel stop means and mechanism for operating this to facilitate the nailing of boxes as in manufacturing or strapping the same.

It is another object of my invention to provide a novel method and machine for strapping boxes in which a surplus of strap material is made available during each nailing operation for use in the next nailing operation thereby facilitating the repositioning of the box for the next nailing operation.

It is also an object of my invention to provide a novel method and machine for strapping boxes in which the strap is nailed to a given face of a box in the initial nailing operation with a relatively long end portion of said strap extending beyond said face and in which said end portion is protected from deformation during a subsequent nailing operation preceding the time when said strap end portion is nailed to said box.

It is another object of my invention to provide a novel method and machine for strapping boxes in which the strap material is automatically positioned between the nail chucks and the box so that the nails driven from these chucks pierce said material in a predetermined relation with the latter.

Another object of my invention is to provide a novel method and machine for strapping boxes in which a loose end of strap material of substantial length is nailed to a box and in which said loose end of strap material is automatically brought into alignment with the nails to be driven through said strap immediately prior to the driving of said nails.

The manner of accomplishing the foregoing objects as well as further objects and advantages will be made manifest in the following description taken in connection with the accompanying drawings in which:

Figs. 1 to 39, inclusive, illustrate the construction and operation of a preferred form of strap machine of this invention, adjusted to apply a strap around four sides of each end of a box as illustrated in Fig. 3.

Figs. 40 to 50, inclusive, illustrate the same machine as shown in Figs. 1 to 39, except for certain changes in adjustment and in details of the construction thereof to enable the machine to apply a strap on three sides of each of the ends of a box as shown in Fig. 45.

Figs. 51 to 54, inclusive, show a modified form of box stop mechanism included in the machine of my invention.

Figs. 55 to 57, inclusive, illustrate a power strap feed mechanism which may be employed on the machine of this invention.

Figs. 58 to 63, inclusive, illustrate the construction and operation of a modified form of strap aligning mechanism adapted for use with said machine.

Figs. 64 to 67, inclusive, show a still further method of strapping a box and the changes in the anvil construction of the machine of my invention which are necessary to accomplish the strapping of a box as shown in Fig. 64.

Fig. 2 is a vertical cross-sectional view of said machine taken on the line 2—2 of Fig. 1.

Fig. 3 is a perspective view of a box, ends of which have been strapped in said machine.

Fig. 4 is a rear elevational view of the lower portions of said machine.

Fig. 5 is a diagrammatic vertical sectional view taken on the line 5—5 of Fig. 4 and showing the strap feed motor control switch and operating cam therefor as said switch and cam are positioned when the operation of said machine is commenced, said motor then being energized to rotate in a direction to feed strap material.

Fig. 6 is a view similar to Fig. 5 and shows said switch and cam as positioned just before the second strap nailing operation of said machine, said motor then being shut off.

Fig. 7 is a view similar to Fig. 5 in which said switch and cam are shown in the position in which they are found just prior to the third nailing operation of said machine in the strapping of a box, said strap feed motor then being in reverse.

Fig. 8 is a view similar to Fig. 5 in which said switch and said cam are shown in the positions in which they are disposed just prior to the fourth nailing operation of said machine in the strapping of a box, said strap feeding motor then being shut off.

Fig. 9 is a fragmentary sectional view taken on the line 9—9 of Fig. 4 and illustrating one of the strap releasing cams as this is positioned just prior to the first nailing operation of said machine. This view and Fig. 5 are taken at the same instant in the operation of the machine.

Fig. 10 is a view similar to Fig. 9 showing said strap releasing cam positioned as it is just before the second nailing operation of said machine. This view and Fig. 6 are taken at the same instant in the operation of the machine.

Fig. 11 is an enlarged fragmentary horizontal sectional view looking upwardly and taken on the line 11—11 of Fig. 9, said view illustrating the adjustable control means for regulating the length of strap material fed by the strap feeding mechanism.

Fig. 12 is an enlarged fragmentary detailed view taken on the line 12—12 of Fig. 4 and illustrating the mechanism for supporting and actuating one of the strap cutters of my invention.

Fig. 13 is a fragmentary detailed sectional view taken on the line 13—13 of Fig. 12 and illustrating the strap feed means and strap cutter cam mechanism.

Fig. 14 is an enlarged detailed sectional view of one of the strap cutters of my invention taken on the line 14—14 of Fig. 12.

Fig. 15 is a vertical sectional view taken on the line 15—15 of Fig. 14 and showing the strap cutter of my invention in retracted position.

Fig. 16 is a view similar to Fig. 15 showing said strap cutter in strap cutting position.

Fig. 17 is a horizontal cross-sectional view taken on the line 17—17 of Fig. 15 and illustrating the shape of the dies of said cutter.

Fig. 18 is an enlarged detailed cross-sectional view of one of the strap corner formers of my invention.

Fig. 19 is a bottom plan view taken in the direction of the arrow 19 in Fig. 18.

Fig. 20 is a vertical sectional view taken on the line 20—20 of Fig. 18.

Fig. 21 is an enlarged fragmentary perspective view of the foremost extremity of a length of strap material when this is being fed into said machine.

Fig. 21a is an end elevational view taken in the direction of the arrow 21a in Fig. 21.

Fig. 22 is a vertical transverse sectional view through the anvil mechanism of my invention taken on the line 22—22 of Fig. 2.

Fig. 23 is a horizontal sectional view taken on the line 23—23 of Fig. 22.

Fig. 24 is a diagrammatic view illustrating the manner in which a box is supported by the anvil mechanism of my machine during each of the first and third nailing operations in the strapping of said box.

Fig. 25 is a view similar to Fig. 24 and illustrating what happens at the completion of each of the first and third nailing operations in the strapping of a box.

Fig. 26 is a view similar to Fig. 24 and illustrates the position of the anvil mechanism at the beginning of each of the second and fourth nailing operations.

Fig. 27 is a diagrammatic fragmentary cross-sectional operation view illustrating the situation at the beginning of the first nailing operation in strapping a box, and showing the position of the strap after it has been automatically fed forwardly between the nailing units and the ends of the box.

Fig. 28 is a view similar to Fig. 27 and illustrates the situation at the beginning of the second nailing operation.

Fig. 29 is a view similar to Fig. 27 and illustrates the situation at the beginning of the third nailing operation.

Fig. 30 is a view similar to Fig. 29 and illustrates the situation during the third nailing operation as the nails are driven into the box and as the strap is cut.

Fig. 31 is a view similar to Fig. 28 and illustrates the situation at the beginning of the final or fourth nailing operation.

Fig. 31a is a fragmentary perspective view illustrating the overlapping ends of strap where these are nailed together to a box end by the completion of the operation illustrated in Fig. 31.

Fig. 32 is an enlarged detail view of one of the strap guiding devices mounted on the nail chucks, this view being taken on the line 32—32 of Fig. 31.

Fig. 33 is a bottom plan view of Fig. 32 and is taken in the direction of arrow 33.

Fig. 34 is a side elevational view of Fig. 32 and is taken in the direction of arrow 34.

Fig. 35 is an enlarged detail view of a portion of Fig. 27 and illustrates the method of feeding the strap into the machine.

Fig. 36 is a fragmentary detail view illustrating the manner in which the strap is shaped about the front corner of the box during each nailing operation.

Fig. 37 is a view similar to Fig. 35 and illustrates the manner in which the strap is formed about both the front and rear corners of a box during the fourth nailing operation of the machine.

Fig. 38 is an operation view of one of the strap guiding devices provided on the nail chuck and is taken on the line 38—38 of Fig. 37.

Fig. 39 is a diagrammatic fragmentary perspective view illustrating one of the strap forming devices which operate on the straps at the upper rear corner of the box during the fourth nailing operation.

Fig. 40 is a fragmentary diagrammatic operation view illustrating certain operative parts of the machine as these are positioned at the beginning of a new modified cycle of strapping operations for strapping a box as shown in Fig. 45.

Fig. 41 is a view similar to Fig. 9 but showing a modified strap releasing cam adapted for use in strapping a box as shown in Fig. 45 and positioned as at the beginning of a modified cycle of strapping operations as aforesaid.

Fig. 42 is a view similar to Fig. 40 and illustrating the situation at the beginning of the second operation of the aforesaid modified cycle of strapping operations.

Fig. 43 is a view similar to Fig. 41 and illustrating the position of the modified strap releasing cam shown therein when the parts of the machine are positioned as shown in Fig. 42.

Fig. 44 is a view similar to Fig. 42 taken during the middle of the second strapping operation and illustrates the nailing of the straps to the bottom of the box, the cutting of the strap, and the lowering of the strap idler wheels to grip the straps against the strap feed wheels thus preventing the straps from withdrawing from the strap feed mechanism when they are cut.

Fig. 45 is a perspective view of a box after this has been strapped by the modified cycle of strapping operations aforesaid to provide what is known as a "three-quarter" strapping job.

Fig. 46 is a view similar to Fig. 40 and illustrates the situation at the beginning of the third nailing operation of the aforesaid modified cycle.

Fig. 47 is a fragmentary view similar to Fig. 46 and illustrating the manner in which the operator may bend the final lap end portions of the straps over the adjacent corner of the box preparatory to forming the final or fourth nailing operation of said modified cycle.

Fig. 48 is a view similar to Fig. 5 but showing a modified switch operating cam for use in the modified cycle of strapping operations aforesaid, said cam being positioned when the parts of the machine are disposed as shown in Fig. 40, that is, as at the end of a fourth nailing operation and at the beginning of a first nailing operation in said modified cycle.

Fig. 49 is a view similar to Fig. 48 and illustrates said cam positioned as when the parts of the machine are disposed as shown in Fig. 42.

Fig. 50 is a view similar to Fig. 49 and illustrates said cam with the latter positioned as when the parts of the machine are disposed as shown in Fig. 46.

Fig. 51 is a diagrammatic perspective view of a modified form of upper box stop mechanism which forms a part of my invention, said view showing the upper box stops positioned as at the beginning of the first and third nailing operations.

Fig. 52 is an enlarged fragmentary sectional detailed view of the helical transmission gears of said stop mechanism and is taken on line 52—52 of Fig. 51.

Fig. 53 is a reduced sectional operation view taken on the line 53—53 of Fig. 52 and illustrating said stop mechanism as it is disposed at the beginning of the first and third nailing operations.

Fig. 54 is a view similar to Fig. 53 but showing said mechanism as it is disposed at the beginning of the second and fourth nailing operations.

Figure 1:
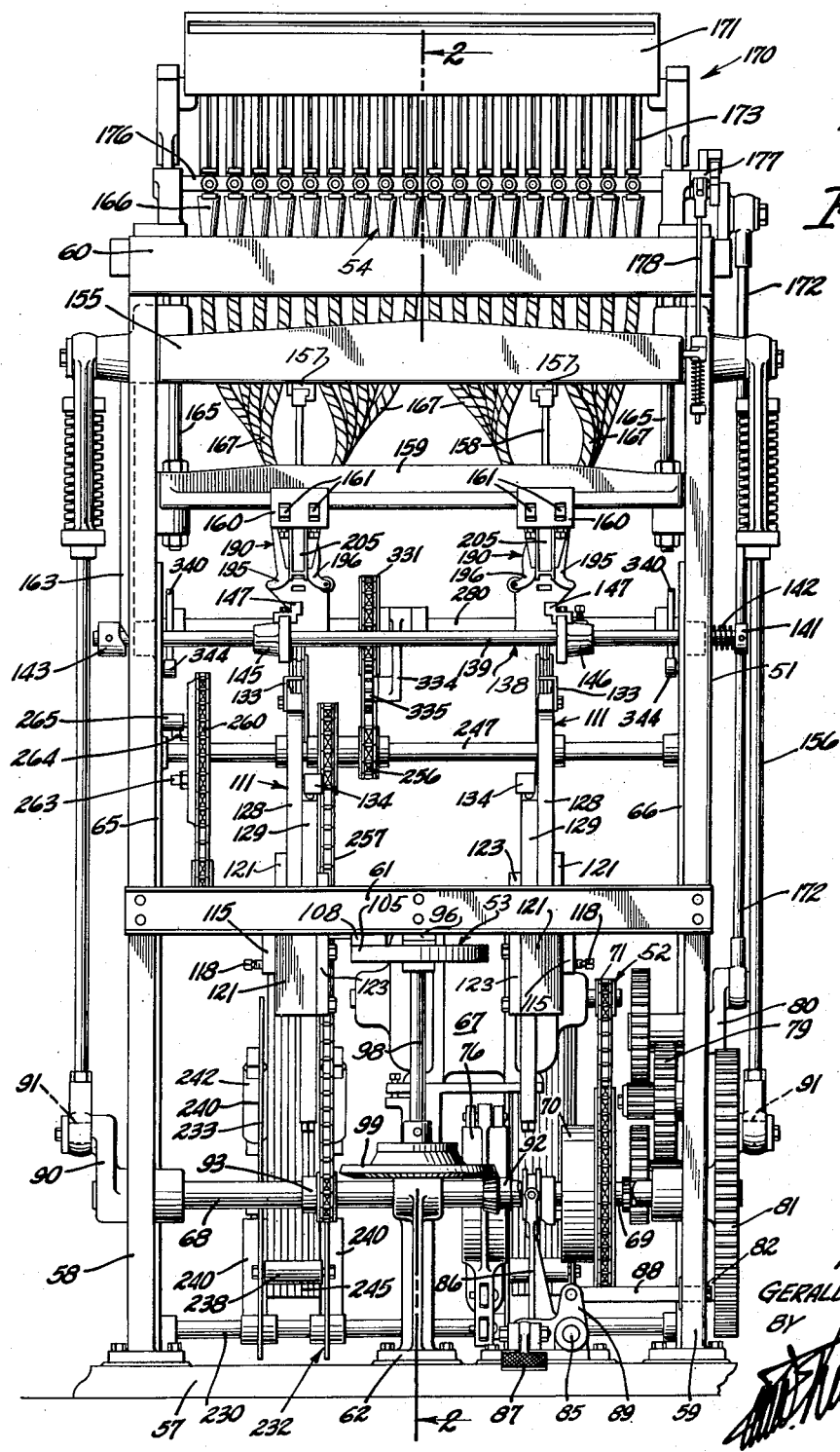
Fig. 1 is a front elevational view of the machine of my invention.

Fig. 55 is a fragmentary diagrammatic side elevational view of the machine of my invention and illustrates a power strap feed mechanism which is a part of my invention and which is adapted to provide an adequate amount of a strap material incidental to each nailing operation so that such material will be available for properly positioning the box in readiness for performing the next nailing operation.

Fig. 56 is a rear elevational view of Fig. 55.

Fig. 57 is an enlarged cross-sectional view taken on the line 57—57 of Fig. 55.

Fig. 58 is a view similar to Fig. 35 and illustrates a modified form of strap material centralizing mechanism for aligning the strap material with the line along which the nails are to be driven therethrough.

Fig. 59 is a cross-sectional view taken on the line 59—59 of Fig. 58 and illustrating a strap guiding and centering device included in said centralizing mechanism.

Fig. 60 is a view similar to Fig. 59 and is taken on the line 60—60 of Fig. 58, this view illustrating another strap guiding and centering device of said mechanism.

Fig. 61 is a view similar to Fig. 60 illustrating the strap guiding and centering device shown therein at a different point in the operation thereof.

Fig. 62 is a cross-sectional view taken on the line 62—62 of Fig. 58 and illustrates a third strap guiding and centering device of the mechanism shown in Fig. 58.

Fig. 63 is a view similar to Fig. 62 and shows the strap guiding and centering device illustrated therein at a different point in the operation of said device.

Fig. 64 is a perspective view of a box after having been strapped by the method and machine of my invention with the strap ends overlapping where they are nailed to a side face of the box and approximately equidistant from the top and bottom edges of said side face.

Fig. 65 is a perspective view of a modified form of anvil especially adapted for use in the strapping of a box as shown in Fig. 64.

Fig. 66 is a fragmentary elevational view taken in the direction of the arrow 66 in Fig. 65 and illustrating the manner in which said modified form of anvil protects a loose strap end from deformation.

Fig. 67 is a fragmentary cross-sectional view taken on the line 67—67 of Fig. 66 and illustrates how a box is supported on said modified form of anvil when a loose strap end is disposed beneath said box without imposing the weight of the box or the pressure of the nailing operation on said loose strap end.

Referring specifically to the drawings, a preferred embodiment of the machine of my invention is shown therein in Figs. 1 to 39 inclusive, which will be designated by the numeral 50 (Figs.

1 and 2). This machine includes a frame 51, a main power mechanism 52, an anvil mechanism 53 (Figs. 1, 2, 22 and 23), a nailing mechanism 54 (Figs. 1, 2, 35 and 37), and a strap feeding mechanism 55 (Figs. 2, 4, 12 and 27).

The frame 51

This frame includes a base 57 (Figs. 1, 2 and 4), having two side standards 58 and 59, the latter being connected by a cross bar 60 and I-beams 61.

Supported upon the main frame base 57, is a main motor base 62. Secured at their forward edges to rear edges of the standards 58 and 59 are rear frame plates 65 and 66.

Main power mechanism 52

This mechanism includes a motor 67 which is mounted on the motor base 62. Journalled in suitable bearings in the standards 58 and 59 and in the motor base 62 is a main crank shaft 68 and a counter shaft 69 (Fig. 2). The motor 67 drives a clutch 70 provided on the counter shaft 69 (see Fig. 1) through a chain 71. The counter shaft 69 also has a hand wheel 75, an automatic brake 76, a master drive pinion 77 and a nail hopper drive pinion 78. Operating through a train of gears 79 mounted on the side frame standard 59, the pinion 78 causes a crank 80 to rotate slowly.

The shaft 68 has a master gear 81 which is driven by the master pinion 77. Provided on the gear 81 is a clutch throw out dog 82.

Journalled in suitable bearings on the base 57 (see Fig. 1) is a shaft 85 bearing an arm 86 which is adapted to be operated by a pedal 87 to throw in the clutch 70. Extending into the path of the dog 82 is a rod 88 which is pivotally connected to an arm 89 on the shaft 85 and is slidably mounted in the standard 59 so that at the completion of each revolution of the master gear 81 and the main crank shaft 68 on which this is mounted, the dog 82 engages the rod 88 and throws out the clutch 70. This action is also effective, through means well known in the art, to set the brake 76 and stop the rotation of counter shaft 69.

Provided on the opposite end of the shaft 68 is a crank 90 and this crank and the master gear 81 have crank pins 91 which are always upwardly disposed when the dog 82 halts rotation of the shaft 68.

The shaft 69 also has fixed thereon a miter pinion gear 92 and a pinion sprocket 93.

Anvil Mechanism 53

This mechanism is best shown in Figs. 1, 2, 22, 23, 24, 25 and 26. It includes a beam 96 (see Figs. 2 and 22), opposite ends of which extend slidably into the inner channels of the I-beams 61 and are secured thereto by cap screws 97. Journalled in the beam 96 and in the main motor base 62 is a vertical shaft 98 bearing at its lower end a miter gear 99 which is connected (see Fig. 2) through a shear pin 100 to a flanged collar 101 fixed on this shaft. Provided on the upper end of the shaft 98, above and below the beam 96, are channel cams 105, having channels 106. Mounted in the beam 96 are slide rods 107. Slidable on these rods are cam followers 108 having rollers 109 which extend into the channels 106 as clearly shown in Fig. 22 and Fig. 23. The followers 108 have rods 110 which extend in opposite directions each of these rods being adapted to control the position of one of a pair of anvil units 111.

Each of the anvil units 111 includes a sliding base 115 (see Fig. 23) having feet 116 which are slidably disposed in the inner channels of the I-beams 61. Each of the rods 110 extends through a suitable hole in one of the sliding bases 116 and is secured thereto by a set screw 117. Each base 115 also has a set screw 118 which serves the purpose of an adjustable stop.

Each unit 111 has a slide body 120 including side members 121 which are pivotally supported on the sliding base feet 116 by trunnion pins 122 and which are connected to a boss plate 123 by cap screws 124. Provided on the plate 123 is a boss 125 the latter having vertical threaded apertures 126.

The slide body 120 forms a vertical slide way 127 which snugly receives upper and lower anvils 128 and 129. Each of the anvils 128 and 129 has a vertical slot 130 therein in which a threaded shaft 131 is rotatably mounted, this shaft screwing through one of the holes 126 in the boss 125 (see Fig. 23), and being rotatable by a squared head 132 to adjust that particular anvil up or down as required. Adjustably secured on the upper rear ends of the anvils 128 and 129 of each unit are stops 133 and 134, respectively.

The anvil units 111 are adapted to be swung about the trunnion pins 122 so as to swing the upper ends of these units outwardly. The adjustable stops 118, however, bear against the lower portion of anvil 128 (see Fig. 22) so as to prevent the upper portions of the anvil units from rocking inwardly beyond vertical position. If one of the anvil units 111 is rocked outwardly, it tends to return to vertical position by gravity when released.

Mounted in the machine 50 just above the anvil mechanism 53 is a box flushing mechanism 138 (as shown in Figs. 1 and 2). This includes a pair of shafts 139 and 140, the latter being fixed at its ends upon the side frame plates 65 and 66, and the former (see Fig. 1) being slidably mounted on said frame plates and extending laterally therebeyond on both sides of the machine. At one end, shaft 139 has a collar 141 fixed thereon and a spring 142 disposed about said shaft between said collar and the side frame plate 66 maintains the shaft 139 disposed in a rightward direction as shown in Fig. 1.

On the opposite end of the shaft 139 is a cam block 143 which has a beveled cam face as shown in Fig. 1. Mounted on the shaft 139 and 140 are box end flusher arms 145 and 146, the former of these being fixed to the shaft 140 and slidable relative to shaft 139 while arm 146 is slidable relative to shaft 140 and fixed to shaft 139. Adjustably mounted on the upper edges of the arms 145 and 146 (see Figs. 1, 2 and 39) are rear corner strap shapers 147.

Nailing mechanism 54

This mechanism is best shown in Figs. 1, 2 and 35 and 37. It includes a crosshead 155 which is slidably mounted on the upper ends of the side standards 58 and 59 in vertical slots formed in the latter. The crosshead 155 is supported by pitmans 156 which are pivotally mounted on opposite ends of the crosshead and the lower ends of which are pivoted on the crank pins 91. The crosshead 155 has driver beams 157 which are adjustable laterally on the crosshead and upon which are mounted a multiplicity of nailing punches 158, the latter being adjustable longitudinally on the beams 157.

Suspended from the crosshead 155 (see Figs. 1 and 2) and vertically slidable relative thereto is a chuck supporting yoke 159, the latter having slidable clamps 160 by which pairs of bars 161 are adjustably secured to the yoke 159. Mounted adjustably between each pair of bars 161 is a series of nail chucks 162 there being one of these nail chucks for each of the punches 158 and in alignment with the latter so as to slidably receive the lower end thereof.

The chuck supporting yoke 159 is supported from the crosshead 155 by vertical shafts 165 which extend upwardly through the crosshead and support a bank of nail receiving funnels 166, each of which is connected by a flexible tube 167 with one of the nail chucks 162. Mounted upon the upper ends of side standards 58 and 59 is a nail storage and feeding mechanism 170 which may be substantially like that shown in U. S. Letters Patent to Herbert E. Twomley, No. 1,409,801, issued March 14, 1922.

This mechanism includes a pivoted hopper 171 which is reciprocated between upwardly and downwardly inclined positions by a pitman 172 (see Fig. 1) pivotally connected on its opposite ends to the hopper 171 and to the crank 80. This mechanism also includes a series of nail runways 173 which deliver the nails from the hopper 171 to a series of nail picks 174 which are operated by rollers 175 on a rotating control bar 176, the latter being turned by a ratchet mechanism 177 and an arm 178 which is reciprocated vertically by the crosshead 155 during each nailing operation. There is a runway 173 and nail pick 174 for each of the nail receiving funnels 166 and there is a set of four rollers 175 on the shaft 176 for each of the picks 174. The ratchet mechanism 177 operates so as to rotate the control shaft 176 one quarter revolution for each nailing operation. During each such quarter revolution of the shaft 176, each of the nail picks 174 is actuated to deliver into its funnel 166, by one of its four rollers 175 being swung through an arc of 90 degrees past this nail pick. Where any of these rollers 175 are removed from the shaft 176, however, the nail pick which otherwise would have been actuated by the roller thus eliminated will fail to feed a nail whenever the space where this removed roller had been is turned around opposite that nail pick. This is to enable the adjustment of this machine to feed nails to certain of the chucks during certain nailing operations and to fail to feed nails to these chucks during other nailing operations, as will be made clear in the description of the operation of the machine 50.

Each of the nail chucks 162 (see Figs. 32, 33 and 34) has a body 180 having an internal chamber into which a nail is fed from one of the tubes 167, this nail being fed in between a pair of chuck jaws (not shown) which are spring pressed inwardly by leaf springs 185. Fixed upon the lower end of the chuck body of each of the nail chucks 162 is a strap guide plate 186 having a hole 187, through which the nail is driven from the chuck, and strap guiding ribs 188 on opposite sides of said hole.

Provided on certain of the chucks 162 as shown in Figs. 32 to 35 inclusive, are strap flushing devices 190, there being as many of these devices as are necessary to properly guide the strap in a manner to be described hereinafter. Each of these includes a pair of bifurcated arms 191 and 192 which are eccentrically pivoted by a pin 193 on the body 180 of the chuck and are connected together by springs 194 which maintain flusher heads 195 and 196 normally swung into positions beneath the chuck body as shown in Fig. 32. When thus swung inwardly, the distance between the guide heads 195 and 196 is approximately equal to the width of the strap material to be used in the machine 50. Stop screws 197 provided on these may be adjusted to determine the inwardmost positions of the guide heads 195 and 196. As shown in Fig. 32, the eccentric position of the pin 193 permits the arm 192 to be swung upwardly into the dotted line position 198, the necessity for which will be made clear hereinafter. Provided on the head 196 is a roller 199 to reduce friction when this head engages a side or bottom of a box.

While I find it preferable to use the strap flushing devices 190 on only two of the chucks 162 on each side of the machine, as shown in the drawings, these guiding devices may be used on fewer or more of the chucks wherever this is desired. Also carried on the crosshead 155 (see Fig. 1) is a cam 163 which slides against the outside of frame standard 58, so that when the crosshead is lowered, the cam 163 passes between this standard and block 143 thus shifting shaft 139 to the left and compressing spring 142.

Supported at the front end of each chuck unit on the bars 161 thereof is a strap corner shaping device 205. Each of these devices includes a yoke like body 206 which embraces bars 161 as shown in Fig. 20 and has set screws 207 for fixing this body upon these bars. Extending into a recess 208 formed in the body 206 is an arm 210 which is pivoted on the body on a pin 211.

The arm 210 has a recess 212 in its rear face leaving an inner wall 213, side walls 214, a bottom wall 215, the lower end of the wall 213 having a beveled face 216 which terminates at its upper edge in a transverse notch 217. Formed upwardly in the arm 210, from the beveled face 216 and notch 217, is a narrow slot 218 which opens into the recess 212 and in which is pivotally mounted a guide finger 220. The upper end of the guide finger extends into the recess 212 and is held against the wall 213 by a leaf spring 222 so as to cause the lower edge of the finger to extend across the notch 217 in the plane of the beveled face 216.

Extending through the upper end of the leaf spring 222 and through a suitable opening in the wall 213 and threadedly received in a suitable hole in the body 206 is a threaded stud 223, a nut 224 on which compresses a spring 225 against the leaf spring 222 and the wall 213 which yieldably holds the arm 210 and the finger 220 in the positions in which they are shown in Fig. 18.

It is to be noted in this figure that the side walls 214 extend downwardly below the lower wall 215 to form a guide channel 226, the side walls at the inner end of which are flared, as shown in Fig. 19.

*Strap feeding mechanism 55*

This mechanism is supported on the rear frame plates 65 and 66. It includes a pair of reel supporting shafts 230 and a spacer shaft 231, opposite ends of which are rigidly secured to the frame plates 65 and 66, (see Figs. 2 and 4).

Supported on the shaft 230 are two strap reels 232 each of which includes a pair of side plates 233 equipped with sleeves 234 which are slidable on the shafts 230 and may be fixed to the latter as by set screws 235. The plates 233 of each reel 232 are spaced apart by ball bearings 236 (see Fig. 4) held in place by cap screws 237 and on which rollers 238 are rotatably mounted. Plates 233 are also spaced by spacers 239.

Each of the plates 233 is also provided with a multiplicity of slots 240, adjacent opposite ends of which are provided bearings 241 in which the trunnions of rollers 242 and 243 are journalled.

Each reel 232 is adapted to receive and rollably support a coil 245 of strapping material, the latter resting upon the rollers 238 and being guided on opposite sides, as it rotates, by the rollers 242 and 243 as clearly shown in Fig. 4. As the coils 245, come with standard inside diameters, each reel 232 includes a cylindrical ring 246 which is placed inside of the coil before it is inserted in the reel.

Journalled in suitable bearings provided on the frame side plates 65 and 66 is a main strap feed shaft 247. Adjustably fixed on this shaft in vertical alignment with each of the reels 232 is one of a pair of strap feed wheels 250. Also fixed on the shaft 247 is a pair of collars 253 between which a double sprocket 254 is freely rotatable on shaft 247. This double sprocket includes sprockets 255 and 256, the former of which is in alignment with and is connected to sprocket 93 by an endless chain 257 (see Figs. 1 and 2).

Also fixed upon shaft 247 is a sprocket wheel 260, (see Figs. 4, 9, 10 and 11), this wheel having formed therein a concentric annular T-slot 261. Slidably disposed in the slot 261 are heads 262 of adjustable stop pins 263 and 264.

Mounted on the plate 65 is an abutment block 265, this block extending into the path of the pins 263 and 264 when the sprocket wheel 260 is rotated.

Mounted on the side of the plate 65 (see Figs. 2 and 4) is a strap feed motor 270 having a reduction gear 271 which operates through a disc friction clutch 272 to rotate a sprocket 273 which is in alignment with and connected by a chain 274 to the sprocket 260.

Provided in the frame side plates 65 and 66 directly above the shaft 247 are slots 275 (see Figs. 9 and 10) in which bearings 276 are loosely, vertically slidable, these bearings being spring pressed downwardly by springs 277 which are held down against these bearings by screws 278 provided in caps 279 mounted on the walls 65 and 66 over the slots 275. Journalled in the bearings 276 is a control shaft 280. Freely rotatable on the shaft 280 so as to be in vertical alignment with the strap feed wheels 250 are strap idler wheels 281 (see Fig. 4), these wheels being adapted to rest on the wheels 250 during certain portions of the operation of the machine 50. Fixed to the shaft 280 just inside of the idler wheels 281 are strap cutter cams 282 while embracing each wheel 281 and the cam 282 alongside this are collars 283 and 284 of a yoke 285. This yoke also has integral therewith cutter support shaft collars 286 (see Fig. 13) in which are fixed the rear ends of two shafts 287, the outer faces of which are flattened, and a bearing 288 in which is journalled the rear end of a splined cutter actuating shaft 290.

The yoke 285 also has a forwardly extending flange 293 which carries strap straightening rollers 294, these rollers being in vertical alignment with the adjacent wheels 250 and 281. The forward ends of the shafts 287 are received by and rigidly fixed in collars 295 of a bracket 296 which is rotatably mounted on the shaft 140, (see Figs. 2 and 35). Provided on the bracket 296 in a web portion 297 thereof is a rearwardly facing funnel 298, the small mouth of which opens toward the front of the machine and is only slightly larger than the strap material to be used in the machine.

Slidably mounted on the shafts 287 and 290, on each side of the machine, (as shown in Figs. 2, 12, 14, 15, 16 and 17) is a strap die cutter 300. This cutter has a body 301 having bosses 302 for receiving the shafts 287 and providing set screws 303 for fixing the cutter 300 in any desired position on these shafts.

The body 301 is bifurcated at the upper end to provide spaced bearings 304 in which the shaft 290 journals and between which a cutter arm 305 is splined on said shaft. This arm also has a set screw 306 for fixing the arm 305 onto the shaft 290. The body 301 has a punch guide well 307 in which a punch 308 is vertically slidable there being a pitman 309 pivotally provided on the lower end of the arm 305 the lower end of this pitman resting in a notch 310 in the upper surface of this punch for the purpose of forcing the punch downwardly when the shaft 290 is rotated.

The lower or cutting edge of the punch 308 has arcuate notches 311 formed from opposite sides of the punch. The punch also has vertical holes 312 near its narrower edges, the purpose of which will presently be made clear.

Secured to the lower end of the body 301 as by screws 313 is a die block 314 and a bottom plate 315. The die block 314 has formed therein a vertical well 318 which constitutes a downward extension of the well 307 when the block 314 is applied to the body 301. Formed in the lower face of the body 301 is a strap passageway 319.

The bottom plate 315 has a central hole 320 which corresponds in width to the well 318 of the block 314 but is shorter in length and has pins 321 provided thereon which extend upwardly into the holes 312 in the punch 308. Surrounding these pins below the punch are coil springs 322 which continually urge the punch upwardly against the pitman 309. Mounted in the die block 314 is a pair of round dies 326, the upper faces of which are beveled downwardly in opposite directions in alignment with the passageway 319 and are provided with ribs 327 (see Fig. 14) which tend to fit corrugations preferably formed in the strap material which the die cutter 300 is specially designed to cut. The inner edges of the dies 326 are disposed just below and concentric with the arcuate notches 311 in the punch 308, so that when a piece of strap material S is lying in the passageway 319 and the punch 308 is lowered, this material will be cut in two to form rounded ends on the strap on each side of the cut, this being accomplished by removing from the strap a very narrow section thereof, this cutting action being shown in Fig. 16. The severing of the strap material S in this manner imparts a bull nose conformation 328 to the end thereof, as shown in Fig. 21, and at the same time bends down end portions 329 of the strap for the purpose which will be made evident hereinafter.

Also carried on the shaft 280 (see Figs. 2 and 4) is a sprocket 330 which is aligned with and connected to sprocket 256 by an endless chain 331. Rotatable on the shaft 280 between the sprocket 330 and a collar 333 is an arm 334 carrying an idler sprocket 335 which is held in mesh with the chain 331 by a spring 336 connecting said arm with a collar 337 fixed upon the shaft 231.

Fixed upon opposite end portions of the shaft 280 just within the bearings 276 are shaft supporting cams 340 (see Fig. 4), one of these being shown in Figs. 9 and 10 as having a single high face 341 and a single low face 342. Disposed beneath the cams 340 are rollers 344 which are pivotally mounted on the side plates 65 and 66 and which engage the high faces 341 of the cams 340 when these faces are disposed downwardly so as to support the shaft 280 and assembled parts to separate the idle wheels 281 and the strap feed wheels 250 and thus permit strap material S to be freely drawn between these wheels. Fig. 9 shows the shaft 280 turned so that low faces 342 of the cams 340 are over the rollers 344 this permitting the shaft 280 to drop downwardly so that when pieces of strap material S are extended between the wheels 250 and the idler wheel 281 these pieces of strap material will be gripped by these wheels (see Fig. 12) under pressure of the springs 277.

As seen in Fig. 4, one end of the shaft 280 extends outwardly beyond the frame side plate 65 and has fixed thereon a switch cam 350 (see Figs. 5 to 8, inclusive) having a high face 351, two medium faces 352 and 353 and a relatively short low face or dwell 354.

Mounted on the plate 65 is a switch 360 having a central arm 361 which is continually spring pressed upwardly so as to force a roller 362, mounted on a bell crank 363, pivoted on frame plate 65, against the periphery of the cam 350. The switch 360 is connected in the three phase circuit of the motor 270 in exactly the same manner as the switch shown in Fig. 5 of U. S. Letters Patent to H. Paxton, et al., Ser. No. 2,084,048, issued June 15, 1937, on an Automatic lid nailing machine. The only difference in operation of the switch 360 lies in the fact that the stem 361 is spring pressed upwardly by a spring 370 so as to always keep the roller 362 in contact with the periphery of the cam 350. At the bottom of each of Figs. 5, 6, 7 and 8 appears a legend indicating the effect had upon the motor 270 when the switch 360 is positioned as shown in that particular figure.

I shall now refer specifically to Figs. 55, 56 and 57, wherein is illustrated a strap slack providing mechanism 440 which is a part of my invention. This mechanism includes a shaft 441 which is journalled in the frame side plates 65 and 66 as shown in Fig. 56 and has collars 442 preventing endwise motion. Fixed on the shaft 441 are hubs 445 of bifurcated arms 446 formed of spaced bars 447, the upper ends of which are formed integral with the hubs 445 and extend downwardly as shown in Fig. 55, these bars having curved lower ends 448 which are connected by a curved plate 449 to form an external channel 450 which is in substantial alignment with the center portion of one of the reels 232. The strap S proceeding from the coil 245 of strap material contained in each reel passes through the channel 450 of one of the arms 446 and is trapped therein by a pin 455 opposite ends of which are fixed to the curved ends 448 of the bars 447. (See Fig. 57.)

Fixed on one end of the shaft 441 is an arm 456 having a series of holes 457 through one of which a pin 458 extends to connect this arm to an adjustable link 459, the opposite end of which is pivotally connected to an adjustable extension 460 mounted on the extremity of the crank pin 91 of the master gear 81.

The operation of the mechanism 440 takes place during each nailing operation and includes a swinging of the arms 446 from the full line position, in which they are shown in Fig. 55, to the broken dotted line position 465 and return. As will be readily seen this produces a quantity of slack 466 in the strap S which is thus rendered easily available to the operator of the machine so that there will be no resistance of the straps to his rotating the box to position this for carrying out the next nailing operation.

*Operation*

One of the outstanding features of the machine 50 of my invention is that it is adjustable to strap boxes varying in length, width and depth. In the drawings this machine is shown as adjusted for the strapping of a box B, one of these boxes, after it has been strapped in the machine 50, being illustrated in Fig. 3. Before these boxes are strapped in the machine 50, they are assembled in a box making machine and appear exactly as the box B in Fig. 3 excepting that they do not have the straps S on the opposite ends thereof as shown in this figure.

Before describing the adjustment of the machine 50 or the details of its operation, it is desired to point out briefly that four successive nailing operations are performed by the machine 50 in strapping box B. Each of these operations is accomplished by the operator placing the box in a particular position in the machine 50 and then stepping momentarily on the pedal 87. The latter sets the machine in motion by throwing in clutch 70 and causing a single revolution of the shaft 68 and a single vertical reciprocation of the crosshead 155 to drive nails from the chucks 162 through the straps and into end portions of the box in a manner well known in the art.

In the first nailing operation the straps are nailed to one side of the box. In the second operation the straps are nailed to the bottom of the box. During the third operation the straps are nailed to the second side of the box and the straps are cut providing loose portions of predetermined length at each end of the box. In the fourth operation, the last mentioned loose portions of strap, which may be termed "overlap portions," are brought into overlapping relation with "underlapping portions" at the opposite ends of the straps and both these portions are together nailed to the open top edges of the box ends. The fourth nailing operation also sets off the strap feeding mechanism to cause the latter to automatically feed these straps forwardly into the machine in readiness to start the first operation of the next strapping cycle.

In starting to adjust the machine 50 for strapping box B, the nail chucks 162 are arranged in two rows between two pairs of bars 161 on the nail chuck yoke 159, these rows of nail chucks being spaced apart so that when the nails are driven therefrom they will enter the end portions of the box B in planes equidistant from the opposite faces of the box ends 375. While in some boxes the height is equal to the depth, in box B the height is substantially less than the width of the box. Each of the rows of chucks 162 therefore will include one chuck for each of the nails which it is desired to drive into the box B along the longer of these two dimensions, that is, along the bottom and top edges of the box ends. In the present instance, this is nine chucks. The side edges of the box being shorter than the top and bottom edges, certain of the chucks 162 will not be needed in the nailing operations on the sides of the box. In box B, for instance, only seven nails are required in nailing the strap along each side edge of each end thereof.

Only the front seven of each row of nine chucks 162 therefore are used in nailing operations on the sides of the box B. The rollers 175 of the nail feeding mechanism which would otherwise feed nails to the back two pairs of chucks, to be driven downwardly during the first and third nailing operations, are removed from the bar 176 of the nail feeding mechanism so that during the first and third nailing operations these back two pairs of chucks are not supplied with nails.

The nail chucks 161 having thus been properly positioned for strapping box B, it is to be noted that in each nailing operation the chuck yoke 159 moves downwardly with the crosshead 155 until the lower faces of the chucks 162 arrive at the nailing level NL, (see Fig. 2) whereupon the downward movement of the yoke 159 is halted by suitable stops (not shown) and the crosshead 155 continues downwardly causing the plungers 158 to penetrate the chucks and drive the nails from said chucks. In all nailing operations, therefore, the uppermost surface of the work must lie on the nailing level NL to properly receive the nails driven downwardly from the chucks 162. The ends 375 of the box B must also be supported when the box is so positioned. This is done by the anvil mechanism 53 which is now adjusted to properly perform this function in providing support for the box B during all four nailing operations.

The pair of anvils 129 are adapted for supporting the box on its side during the first and third nailing operations and the pair of anvils 128 are adapted for supporting the box while inverted or while bottom down during the second and fourth nailing operations. For either of these pairs of anvils to support the box the anvils of that pair must be directly beneath the box ends 375. At the end of each nailing operation therefore the anvil units 111 have to be shifted laterally inwardly or outwardly, as the case may be, to get the right pair of anvils in position to support the box during the next nailing operation. This is accomplished by the cams 105 which are given a quarter turn by the pinion 92 and the gear 99 during each nailing operation. The units 111 must of course be properly spaced on the rod 110 in order for the pairs of anvils 128 and 129 to thus function. This is accomplished by loosening the screws 117 and shifting units 111 bodily along the I-beams 61.

It is also necessary to adjust the height of each pair of anvils by manipulation of the threaded shafts 131 thereof, to cause the upper surface of the work to be at the level NL during each nailing operation. The pairs of stops 133 and 134 are then set to give the box the proper fore and aft position when it is placed on either pair of anvils and pushed rearwardly against the pair of stops on those anvils.

Fig. 25 illustrates what happens at the end of each of the first and third nailing operations when a one-quarter rotation of the cams 105 pulls the anvil units 111 inwardly to position these so that, when these units are vertically disposed, the anvils 128 will be properly spaced for supporting the ends of the box as shown in Fig. 26. As the inward shifting of the anvil units occurs before the box is removed from the anvils 129, the anvil units are rocked about their trunnions 122, as shown in Fig. 25 until the box is shifted into its next position, as shown in Fig. 26.

When the chucks 162 and the anvil mechanism 53 have thus been adjusted, the box flushers 145 and 146 are then brought into their proper positions on the shafts 139 and 140, so that when the cam 163 moves downwardly with the crosshead 155 in each nailing operation, the flusher 146 will be drawn towards the flusher 145 so as to grip the box B and hold it in exactly the right position beneath the nail chucks for the nailing operation to be performed, providing of course that the box has previously been properly placed on the anvil mechanism 53.

At the time the nail chucks 162 are adjusted on the bars 161, the strap shaping devices 205 are positioned on these bars as shown in Figs. 2 and 35, so that during each strap nailing operation they will engage the straps where these extend over the foremost upper corner of the box and bend these straps around this corner of the box as shown in Figs. 36 and 37.

The rear corner strap shapers 147 are now adjustably fixed on the box end flushers 145 and 146 as shown in Figs. 2 and 39, so that the foremost faces of these shapers are substantially in vertical alignment with the foremost faces of the box stops 133 on the upper anvils 128.

As shown in Fig. 4, the reels 232 and all the parts adapted to cooperate with these reels for the feeding of straps from the coils 245 into position beneath the two spaced rows of nail chucks 162, are slid along their respective supporting shafts and fixed thereon in their proper positions as shown in this figure to accomplish this function. These elements include the wheels 250 on the shaft 247; the cams 282, wheels 281 and the yokes 285 on the shaft 280; and the brackets 296 on the shaft 140, the shafts 287 and 290 and the strap die cutters 300 being supported on and shifted with the yokes 285 and the brackets 296.

In feeding the strap, as will be made clear hereinafter, the sprocket wheel 260 is rotated between the position in which it is shown in Fig. 10 and the position in which it is shown in Fig. 9, these positions being determined by the spacing of the stop pins 263 and 264 on the wheel 260. The distance which it is desired to feed each strap in each feeding operation is the distance from the center of each strap cutter 300 to that point beyond the front upper edge of the box in the first nailing position, to which it is desired that the front extremities of the straps extend when the first nailing operation takes place.

The cutters 300 are also adjustable on their supporting shafts 287 and 290 and their positions on these shafts will determine the length of the pieces of strap material which are left projecting rearwardly beyond the rear upper corner of the box at the end of the third nailing operation.

It might be here pointed out that while the machine 50 of my invention is adapted to perform a great variety of strapping operations on boxes, it is especially useful in strapping the end portions of boxes substantially as shown in Fig. 3. Here it is seen that a length of strap material is wrapped around each end of the box and nailed in place with its ends in lapping relation. These strap ends may be termed the "underlapping strap portions" 376 and the "overlapping strap portions" 377. In Fig. 3 we see the strap portions 377 as considerably longer than the strap portions 376, and while this may be preferable, the machine of my invention is adjustable to vary the relative length of these two lapping strap portions. The length of the underlapping strap portions 376, for instance, is variable by varying the adjustment of the stop pins 263 and 264 on the wheel 260 so as to vary the distances which the front ends of the strap material are fed forwardly beyond the front upper corner of the box at the conclusion of the fourth nailing operation.

Likewise, the length of the overlapping strap portions 377 may be varied by altering the location of the strap cutters 300 on the shafts 287 and 290. That is: shifting these cutters forwardly on these shafts shortens the length of the strap portions 377 while shifting these cutters rearwardly on these shafts, lengthens these strap portions.

When the machine has been adjusted as above outlined, it must then be supplied with strap material. Coils 245 of this strap material are prepared with a cross section as shown in Fig. 21a this preferably including corrugations 380 and 381 which produce a groove 281 along the upper face of the strap. Rings 246 having been inserted in these coils, they are then placed in the reels 232 so as to rest on the rollers 238. These two loose ends of the straps S are then detached from the two coils 245 and fed upwardly between the wheels 250 and 281 so that these straps extend between the upper and lower strap straightening rollers 294 and through the strap cutters 300.

At this point it is necessary to run the machine 50 through a complete cycle of four nailing operations without any box being in the machine and while this is being done it is preferable that no nails be fed to the nail chucks 162. To effect the latter purpose the nail feeding mechanism is temporarily disconnected during the first three of these nailing operations as the nail feeding mechanism must be actuated during the last of these operations to deliver nails to the nail chucks 162 to place the machine in readiness to drive nails from these chucks during the first operation of a succeeding cycle.

It is to be noted that at this time when the machine is in readiness to start the first of a cycle of four operations, the anvil units 111 are disposed in their outward positions as shown in Fig. 24, and the cams 340 and sprocket wheel 260 are positioned as shown in Fig. 5. The shaft 280 is thus permitted to drop down so that the wheels 281 compress the straps S against the wheel 250. The significance of the last mentioned point will become apparent in the description of the fourth operation of the cycle just commencing.

At this time the cutter actuating cams 282 on the shaft 280 are positioned as shown in Fig. 12

Also the cam 350 on the end of the shaft 280, is positioned as shown in Fig. 5, which results in the strap feeding motor 270 being driven in a forward direction. This results in a constant slippage between the friction clutch 272 and the sprocket 273 thereby frictionally maintaining the sprocket wheel 260 in the position in which it is shown in Fig. 9 with the stop pin 264 pressed against the abutment block 265.

The pitch ratios between the sprockets 93, 255, 256 and 330 are such that for each revolution of the crank shaft 68, that is, for each nailing operation of the machine, the shaft 280 is rotated one-quarter turn in the direction of the arrow 385 in Figs. 9, 10 and 12.

The operator now initiates the first operation of the initial cycle in which no box is placed in the machine, by stepping on the pedal 87 momentarily. During this operation the nailing mechanism functions without any results; the anvil units 111 are shifted inwardly into the positions in which they are shown in Fig. 26; and the shaft 280 is given a quarter revolution. The latter results in bringing the high faces 341 of the cams 340 downwardly opposite the rollers 344 thereby lifting the shaft 280 and spacing the idler wheels 281 from the strap feed wheels 250 so as to free the straps S and permit these (when a box is being strapped) to be pulled freely forwardly through the strap feeding mechanism. The significance of this will become apparent in describing the next cycle of operations in which a box is being strapped.

The first quarter turn of the shaft 280 results in the cam 350 being turned to the position in which it is shown in Fig. 6, thereby stopping the motor 270.

The second operation of the initial cycle is now performed, this resulting in returning the anvil units 111 to the positions in which they are shown in Fig. 24 and giving another quarter turn to the shaft 280 in the direction of the arrow 385. This brings the high points of the cams 282 to positions directly opposite those in which they are shown in Fig. 12 and brings the cams 340 to the positions in which one of these is shown in Fig. 10, where it is seen that the high faces 341 are still in contact with the rollers 344 so as to keep the idle wheels 281 spaced from the strap feeding wheels 250.

The second quarter turn of the shaft 280 brings the cam 350 to the position in which this is shown in Fig. 7 so as to reverse the motor 270 with the result that the sprocket wheel 260 is rotated in the direction of the arrow 386, shown in Fig. 10, to bring the stop pin 263 into contact with the abutment block 265 and thus halt the rotation of the sprocket 260 causing the friction clutch 272 to again slip.

The third operation of the machine 50 in the initial dummy cycle is now effected with the result that the anvil units 111 are returned to the positions in which these are shown in Fig. 26 and the shaft 280 is given another quarter turn making a total of three-quarters of a revolution from where it was when it started. This brings the low faces 342 of the cams 340 opposite the rollers 344 thereby lowering the shaft 280 so that the idle strap feed wheels 281 come down on the straps S and press these firmly against the wheels 250.

The cam 350 has now been rotated to the position in which it is shown in Fig. 8 which throws the switch 360 into neutral and stops the rotation of of the motor 270. This third quarter revolution of the shaft 280 also swings the high points on the cams 282 past the rollers 292 thereby lifting these and rocking the shafts 290 to swing the arms 305 on the cutters 300 downwardly. This depresses the punches 308 of these cutters, as shown in Fig. 16, and cuts the straps S in two, forming bull-noses 328 on the severed ends of the strap as shown in Fig. 21, and bending the tips 329 of these straps downwardly slightly as shown in this figure.

The fourth operation of the dummy cycle is now instituted with the result that the anvil units 111 are returned outwardly to the positions in which they are shown in Fig. 24 and the shaft 280 is given another quarter turn. At the conclusion of the latter this shaft and all the parts associated therewith are disposed in the same positions as when the first dummy operation was started. That is, the cams 340 are positioned as shown in Fig. 9 and the switch control cam 350 is positioned as shown in Fig. 5. When this latter position takes effect the arm 361 of the switch 360 is permitted to rise, throwing in the switch to energize the motor 270 to cause it to run in a forward direction. This acts through the friction clutch 272 to rotate the sprocket 273 and the sprocket wheel 260 in the direction of arrow 387 in Fig. 9 until the last mentioned sprocket is positioned as shown in this figure with the adjustable pin 264 engaging the abutment block 265. As every rotation of the sprocket 260 also rotates the shaft 247 and the strap feed wheels 250, the rotation of the latter in the direction of the arrow 387 thus caused during the fourth nailing operation is at a time when the straps S are pressed against the feed wheels 250 by the idler wheels 281. This causes a feeding of the straps S, with their front ends cut and shaped as shown in Fig. 21, forwardly through the straightener rollers 294, the cutters 300 and the funnels 298 into the spaces just beneath the rows of nail chucks 162. As these straps are projected forwardly in this feeding movement the bent portions 329 of the front ends of these straps engage the lower faces of the strap guiding devices 186 so that the guiding ribs 188 extend into the grooves 381 and keep the straps S in alignment with the rows of chucks 162 until the forward ends of these straps strike the guide fingers 220 of the strap shaping devices 205. This deflects the strap ends downwardly causing them to pass into and through the guide channels 226 in the bottom faces of the devices 205.

From the bottom plan view of the strap flushers 190 as shown in Fig. 33 it is clear that these flushers assist substantially in guiding the straps S along the paths beneath the rows of nail chucks 162.

As previously explained the nail feeding mechanism 170 was reconnected so as to function during the fourth nailing operation of the cycle just completed so that the front seven pairs of chucks 162 are now supplied with nails. Moreover, being reconnected, the nail feeding mechanism will hereafter continue to function to provide with nails those of the chucks 162 which should have these at the beginning of each nailing operation.

The operator is now ready to start a regular series of box strapping cycles the first of which will be described. A box B as shown in Fig. 3 but without any strap on the ends is now placed in the machine resting on one side on the anvils 129 and with the open top of the box disposed forwardly as shown in Fig. 27. The operator now steps on the pedal 87 to initiate the first nailing operation. This causes the nailing mechanism to move downwardly so that the chucks 162 press the straps S against the end portions of the upturned box side and drive seven nails through each of these straps and into an end portion of the box. Fig. 36 illustrates this nailing operation and shows how the strap shaping devices 205 shape the strap around the forward upper corner of the box and bring the underlapping strap portions 376 down against the forwardly disposed edges of the box ends 375. In this figure it is clear how fingers 220 yield during this operation of the devices 205 so as to permit the notches 217 to receive the straps and shape these around the corner of the box. During each strapping operation of the machine 50 the devices 205 perform the shaping operation shown in Fig. 36 on the straps so as to bend these straps around the corner of the box B which is disposed adjacent to these devices.

The anvil units now being disposed as shown in Fig. 25, the box B is rotated a quarter turn by the operator and lifted slightly to permit the anvil units to swing inwardly whereupon he sets the box down on the anvils 128, as shown in Figs. 26 and 28. In order to do this, it is required that the operator be able to pull the straps S forwardly through the strap feeding mechanism and this he is able to do by virtue of the fact that shaft 280 is lifted by the high faces 341 of the cam 340 engaging the rollers 344 and lifting the wheels 281 out of engagement with the straps. At the end of the first nailing operation the cam 350 is positioned as shown in Fig. 6, thereby stopping the motor 270. With the box repositioned as shown in Fig. 28, everything is in readiness for the second nailing operation which is effected by momentarily depressing the pedal 87.

In the second operation the nailing mechanism nails theh strap S to theh bottom of the box, while this leaves the cams 340 with the high faces 341 still engaging the rollers 344 thus leaving the straps S again free to be pulled through the strap feeding mechanism. It also rotates the cam 350 to the position shown in Fig. 7, which reverses the motor 270 with the result of returning the sprocket wheel 260 to the position in which this is shown in Fig. 10.

The anvil units having been returned outwardly, the box B is given another quarter turn by the operator and set down on the anvils 129 as shown in Fig. 29, additional strap being pulled through the strap feeding mechanism in accomplishing this.

The third nailing operation now takes place with the result that the straps are nailed to the second side as shown in Fig. 30 and the straps are cut by the cutters 300 as shown in this view. The cam 350 being positioned as shown in Fig. 8 during this operation, the motor 270 is now stopped. The anvil units 111 having been shifted inward the operator now rotates the box another quarter turn and places it on top of the anvils 128 as shown in Fig. 31. Here we see the underlap strap portions 376 which are relatively short and the overlapping strap portions 377 which are relatively long. In this view, as in Fig. 37, it is also shown how the rear corner strap shapers shape the strap S around the rear upper corners of the box when the box is pushed backwardly into the position for accomplishing the fourth nailing operation. This results in the straps S closely conforming to this particular corner of the box when the fourth nailing operation is completed.

In this operation, the nailing mechanism nails the lapping strap portions 376 and 377 to the top open edges of the box ends as shown in Fig. 37. While this operation is taking place the strap flushers 190 maintain the overlapping strap portions 377 directly beneath the rows of nail chucks and centralized with respect to the box ends. Regarding the operation of the flushers 190 it is desired to point out at this time that during the first three nailing operations the inner arms 192 of these flushers engage a box side or bottom and the rollers 199 and guide heads 196 on these arms deflect these arms upwardly into the dotted line position 198 in which these are shown in Fig. 32 thus damaging neither the flushers 190 nor the work.

The conclusion of the fourth nailing operation on the box B has exactly the same effect upon the strap feeding mechanism as already described for the fourth operation of the dummy cycle described hereinabove. That is the straps S are fed by the feeding mechanism through the funnel 298 and into the positions as shown in Figs. 27 and 35. Thus the machine 50 is again brought to the conclusion of one four-operation strapping cycle and at the same time is placed in readiness to start the next cycle.

The operation of the machine 50 is capable of modification to adapt it to nail straps to a box X as shown in Fig. 45, to produce what is known as a "three-quarters" strapping job. Here it is seen that strap end portions 390 and 391 do not overlap each other but merely extend a few inches inwardly from each upper side corner of the box and are nailed to the ends. To accomplish this the machine 50 is modified as follows:

Cams 340 are replaced by cams 392 as shown in Fig. 41; cam 350 is replaced by cam 393, shown in Figs. 48, 49 and 50; the cams 282 are retimed (see Figs. 40, 42 and 44) so as to actuate the strap cutters during the second nailing operation instead of the third; and the cutters are adjusted to cut off enough strap, when they operate, (see Fig. 44) to extend along the second box side plus enough to form the end portions 391.

The operation of machine 50 when thus modified is as follows: The first nailing operation is the same as before excepting that during this operation the cams 392 raise the shaft 280 to lift the wheels 281 from pressing on the straps S, (Fig. 43), and the cam 393 reverses the motor 270 (see Fig. 49) to rotate the sprocket 260 and shaft 247 to their reversed positions (see Fig. 42) in readiness to feed strap.

In the second operation the straps are nailed on the bottom of the box; the cutters 300 are actuated by the cams 282 (see Fig. 44) to cut off the straps as above indicated) the motor 270 is shut off (see Fig. 50); and the wheels 281 are lowered to press the straps against the wheels 250 (see Fig. 44).

In the third operation (see Fig. 46) the straps are nailed to the second side of the box; the motor 270 remains shut off; and the wheels 281 remain in lowered position.

Before the fourth operation, the strap ends 391 are bent down by lifting them against the strap shapers 205 (see Fig. 47) when positioning the box on anvils 128. Then when the fourth nailing operation takes place, all four strap end portions 390 and 391 are nailed to the box ends; the wheels 281 remain down; and the motor 270 is energized (see Fig. 48) to run forward and feed the straps into positions (Fig. 40) to start the next strapping cycle.

While it is not always necessary to support the upper end of a box from the rear during the first and third nailing operations, I have found this preferable in many instances and have provided a modified stop mechanism 400 (see Figs. 51, 52, 53 and 54) to accomplish this function.

This mechanism is mounted principally on the box flushing mechanism 138 in which flusher arms 401 and 402 are now substituted for the flusher arms 145 and 146, respectively. As far as the flushing mechanism 138 is concerned, the arms 401 and 402 are constructed, mounted and operated in exactly the same manner as described previously for arms 145 and 146.

In addition, however, each of the arms 401 and 402 has a front bearing 403 and a rear gear box 404 in which is journalled a stop supporting and operating shaft 405. Adjustably mounted on shaft 405 as shown in Fig. 51 are a rear stop 406 and a front stop 407. The stop 406 hooks over the upper edge of the flusher arm on which it is mounted thus preventing its rotation on shaft 405 but permitting its fore and aft adjustment on said shaft. This is effected by bifurcating stop 406 where it surrounds shaft 405 to provide space for a set collar 408 which is adjustably set upon the shaft 405 to hold stop 406 in a given fore and aft position.

Stop 407 when adjusted into place on shaft 405 is rigidly secured thereto by a set screw 409 so as to rock with said shaft when the latter is partially rotated.

With its opposite ends extending through and journalling in the gear boxes 404 is a cross shaft 415 having a spline key way 416, the extremities of this shaft lying just inside the frame plates 65 and 66 as shown in Fig. 52.

Suitable spaces are provided in each of the gear boxes for meshing spiral gears 417 and 418, the first of these being rigidly fixed upon shaft 405 and the latter of which is slidably mounted on shaft 415 and extends into key way 416 so as to rotate when shaft 415 turns. Thus when arm 402 is shifted back and forth on shaft 148 to perform its box flushing operation the gear 418 freely slides on the shaft 415.

The modified stop mechanism 400 is preferably actuated from the anvil mechanism 53 in which a channel cam 419 is substituted for the upper cam 105 on shaft 98. As far as the anvil mechanism is concerned, the cam 419 is constructed, mounted and operated in exactly the same manner as previously described for the cams 105. The cam 419 has in addition, however, a pair of crown cam ridges 420 provided thereon at opposite points on the cam. Pivoted in a clevis 425 on the rear I-beam 61 is a lever 426 carrying a roller 427 at its front end which is adapted to be lifted by each of the crown cam ridges 420 when this passes under said roller. The rear end of lever 426 is connected by a link 428 to an arm 429 fixed on the shaft 415. A coil spring 430 constantly lifts on the link 428 to hold the roller 427 pressed downwardly against the cam 419.

The operation of the stop mechanism 400 is illustrated in Figs. 53 and 54. At the end of each of the second and fourth nailing operations one of the cam ridges 420 is left under the roller 427 as shown in Fig. 51, which swings the shafts 415 and 405 thus rocking stops 407 into their inward full line positions, shown in this figure and in Fig. 53. Here, the stops 407 are positioned to support the back of a box Z during the first or third nailing operation. As shown in Figs. 53 and 54, the box Z is relatively shallow, this being the type of box in the strapping of which the stop mechanism 400 is most useful.

At the end of each of the first and third nailing operations however, the cam ridges 420 are out from under the roller 427 thus permitting the spring 430 to lift link 428 and rock stops 407 outward as shown in full lines in Fig. 54 and in broken lines in Fig. 51. The box Z may now be properly positioned against the stops 406 as shown in this figure for the second or fourth nailing operations.

It is clear that by adjusting the stops 406 and 407 upon the shafts 405 the stop mechanism 400 may be adapted for functioning in the machine 50 on a box of any dimensions coming within the scope of adjustability of the rest of the machine.

One of the special advantages of the mechanism 400 is its automatic positioning of the stops 407 to support the upper portion of the box against displacement rearwardly during the first and third nailing operations. This insures a proper job being done by the strap shaping devices 205 in shaping the straps S around the front upper corner of the box. Where shallow boxes such as box Z are being strapped or where the ends of the boxes being strapped are not square angled, this support greatly facilitates the proper functioning of the shapers 205.

I shall now refer to Figs. 58 to 63, inclusive, which illustrate a modified form of strap centralizing mechanism 470, this mechanism being adapted to be substituted for the strap guiding devices 190, previously described. The mechanism 470 includes cylindrical spacers 471, one of which is provided between each adjacent pair of strap guiding shoes 186, the chucks 162 being spaced apart on the bars 161 sufficiently to permit the introduction of these spacers. The length of these spacers 471 varies of course with that spacing of the chucks which is preferable for each of the many strapping situations the machine 50 is adapted to take care of.

The mechanism 470 also includes a series of strap guiding and centering devices 472 which differ somewhat, there being three types of these devices, 473, 474 and 475, shown in Fig. 58. Each of the devices 472 includes a plate 480 having a T-head 481 which engages the bars 161 and suspends the plate 480 when it is not supported by a box, the plate 480 being freely slidable vertically between the bars 161 and between strap guiding shoes 186 on the chucks between which this particular device 472 is mounted. Secured to one of these chucks adjacent each of the devices 472 is a U-shaped bracket 482 which extends into guiding relation with opposite edges of a lower portion of the plate 480 and across one face of the said plate. The features above described are common to the devices 472, those features in which they differ being as follows:

In device 473, the lower end of the plate 480 thereof is bifurcated to form two guide fingers 483 with rounded lower ends which are separated by a guide recess 484 having upwardly diverging edges, the lower end of said recess being only slightly wider than the strap material S.

The device 475 is substantially like the device 473 excepting that it has a guide recess 485, the edges of which diverge upwardly at a sharper angle than is the case in the recess 484 of the device 473.

In the device 474 the plate 480 is bifurcated at the lower end to provide legs 486 having feet 487, these legs being separated by a strap guiding recess 488, the edges of which diverge downwardly. Pivotally mounted on the plate 480 of this device, as shown in Figs. 60 and 61, are a pair of strap centering jaws 489 which when the device 474 is hanging on the bars 161, as shown in Fig. 60, are extended apart by engagement with the spacer 471 between these jaws, and which, when the device 474 is supported by a box while the bars 161 and the chucks 162 move downwardly, are cammed inwardly by engagement with the U-bracket 482 of this device.

As indicated in Figs. 58, 59, 60 and 62, the devices 472 hang downwardly when the crosshead 155 is at rest in its elevated position between nailing operations and they are thus disposed when the strap S is fed forwardly at the end of each cycle of box nailing operations. When thus fed, the strap extends through the recesses 485, 488 and 484 of the devices 472 so as to be guided by these recesses to direct the front end of the strap into the bottom guide channel 226 of the strap shaping device 205 at this side of the machine.

It will be noted that the recess 485 of the device 475 is considerably wider than the recess 484 of the device 473. This is to permit the recess 485 to receive the front end of the strap with a little more latitude than is necessary at the front end of the machine after the strap end has reached the device 473. By that time the weight of the strap has lowered in the recess 485 until it is at the narrowest point of this recess as shown in Fig. 62, this guiding the strap S so that it readily enters through the recess 488 of the device 474 and then the recess 484 of the device 473. When the front end of the strap strikes the guide finger 229 of the strap shaping device 205 in the path of this strap, it is deflected downwardly so that the strap is disposed in the narrowest portion of the recess 484 as shown in Fig. 59 which guides the front end of the strap directly into the bottom guide channel 226 of the device 205, as shown in Fig. 19.

When the first nailing operation of a strap nailing cycle now takes place the nailing head moves downwardly causing the corner shaping device 205 to shape the front end of the strap S about the front corner of the box and causing the lower ends of the devices 472 to come to rest on the box as indicated in Figs. 61 and 63 after which the chucks continue downwardly until they press the strap down through the recesses 485, 488 and 484 snugly against the box and then the nail punches 158 drive the nails from the chucks through the strap and into the box. As the chucks travel downwardly after the device 474 has come to rest on the box, the jaws 489 are cammed inwardly so as to exactly centralize the strap S relative to the line along which the nails are driven downwardly, as shown in Fig. 61. The feet 487 are provided to prevent the legs 486 from dropping into a crack or knot hole so as to interfere with the operation of the device 474. If, on account of its springiness, the middle portion of the strap S disposed above the box bows upwardly after the front end of this strap has been bent over the front corner of the box, the bowed middle portion of the strap will be disposed at or slightly above the narrowest portion of the recesses 484 and 485 until the chucks come down to engage this portion of strap with the spacers 471 and the strap guiding ribs 188 extending into the upwardly disposed central channel 381 of the strap S thus perfectly centralizing the strap relative to the line along which the nails are to be driven.

Referring now to Figs. 64, 65, 66 and 67, it will be seen that I have illustrated in the first of these views a box Y which is adapted to be strapped by the method and machine of my invention in which underlapping strap portions 491 and overlapping strap portions 492 are approximately the same length and are nailed together to one of the sides of the box. In order to make this box in the machine 50, the latter must be adjusted so that the box is disposed upside down and resting on the anvils 128 for the first nailing operation, as shown in Fig. 58. The feed of the strap is also adjusted so that when the strap is fed into the machine as shown in this figure, under-lapping strap portions 491 extend beyond the box so that during the first nailing operation these underlying strap portions are bent downward from the upper front corner of the box when the latter is so positioned.

To prepare for the next operation, the box is rotated a quarter turn anti-clockwise and placed on the anvils 129. During this operation the strap is nailed to the box side disposed uppermost. The box is then rotated another quarter turn and replaced on the anvils 128 for the third nailing operation in which the straps are nailed to the tops of the box ends. The strap cutter cams have been so timed as to cut the straps S off during the second nailing operation so as to leave not only enough strap material to extend clear across the top of the box ends but leave material extending beyond these ends to form the overlapping strap portions 492.

After the third nailing operation the box is taken in the hands of the operator in a manner similar to that shown in Fig. 47 and the overlapping strap portions 492 are pushed upwardly against the corner strap shapers 205 to bend these strap portions down to facilitate the fourth nailing operation which immediately follows with the box resting on the anvils 129.

If the box Y is big enough so that the overlapping strap ends 492 are of sufficient length the strap cutting operation can be performed in the third nailing operation instead of in the second.

To facilitate the proper operation of the strap centralizing mechanism 470 in the fourth nailing operation, I have found it preferable to protect underlapping strap portions 491 from being deformed during the second nailing operation when these strap portions are disposed downwardly and which tends to occur if these strap portions are compressed between the box and the anvils 129 during this nailing operation. I have therefore provided a pair of face plates 493 having ramps 494 which incline downwardly from the front end of these plates, the latter being adapted to be secured by suitable screws 495 to the upper faces of the anvils 129. Formed upon the plates 493 on their inner edges are shoulders 496 which, as shown in Figs. 66 and 67, engage a downwardly disposed side face of the box Y during the second nailing operation of the cycle just described and thus prevent the deformation of the underlap strap portion 491.

The ramps 494 act as guides to guide the underlying strap portions 491 onto the plates 493 and permit the shifting of the box into position for the second nailing operation with a minimum of attention to the strap portions 491.

The protection thus afforded to the strap portions 491 leaves these strap portions extending from the strap material nailed to the bottom of the box and bent from that strap material at an angle slightly greater than 90 degrees so that the various strap guiding and centralizing devices 472 are capable of properly performing their functions during the fourth nailing operation and engaging and centralizing these underlapping strap portions with respect to the lines along which the nails are driven into the box Y from the chucks 162.

What I claim is:

1. In a box strapping machine, the combination of: means for supporting opposite ends of a box; nailing mechanism for simultaneously driving nails into corresponding edges of said box ends; and means responsive periodically to the last operation of a cycle of four operations of said nailing mechanism for feeding strap material into the spaces between said box ends and said nailing mechanism.

2. In a box strapping machine, the combination of: means for supporting opposite ends of a box; nailing mechanism for simultaneously driving nails into corresponding edges of said box ends; and means responsive to the operation of said nailing mechanism for feeding loose ends of continuous lengths of strap material predetermined distances into the spaces between said box ends and said nailing mechanism.

3. In a box strapping machine, the combination of: means for supporting opposite ends of a box; nailing mechanism for simultaneously driving nails into corresponding edges of said box ends; and means operating automatically and in predetermined relation to successive cycles, each of which includes a multiplicity of operations of said nailing mechanism, for feeding loose ends of continuous lengths of strap material predetermined distances into the spaces between said box ends and said nailing mechanism.

4. In a box strapping machine, the combination of: anvils for supporting opposite ends of a box; nailing mechanism for simultaneously driving nails into corresponding edges of said box ends; and means responsive to the operation of said nailing mechanism for feeding strap material into the spaces between said box ends and said nailing mechanism, said anvils, said nailing mechanism and said strap material feeding means being adjustable to permit said machine to be adapted to strap any one of a multiplicity of boxes varying substantially in length.

5. In a box strapping machine, the combination of: means for supporting opposite ends of a box; nailing mechanism for simultaneously driving nails into corresponding edges of said box ends; means responsive to the operation of said nailing mechanism for feeding loose ends of continuous lengths of strap material predetermined distances into the spaces between said box ends and said nailing mechanisms; and means operating coordinately with said nailing mechanism for cutting off said strap material during a cycle including a multiplicity of nailing operations of said nailing mechanism required for the strapping of a box but before the last operation of said cycle.

6. In a box strapping machine, the combination of: anvils for supporting opposite ends of a box; nailing mechanism for simultaneously driving nails into corresponding edges of said box ends; means responsive to the operation of said nailing mechanism for feeding loose ends of continuous lengths of strap material into the spaces between said box ends and said nailing mechanism, said anvils, said nailing mechanism and said strap material feeding means being adjustable to permit said machine to be adapted to strap any one of a multiplicity of boxes varying substantially in length; and means operating coordinately with said nailing mechanism for cutting off said strap material during a cycle including a multiplicity of nailing operations of said nailing mechanism required for the strapping of a box but before the last operation of said cycle.

7. In a box strapping machine, the combination of: means for supporting opposite ends of a box; nailing mechanism for simultaneously driving nails into corresponding edges of said box ends; means responsive to the operation of said nailing mechanism for feeding loose ends of continuous lengths of strap material into the spaces between said box ends and said nailing mechanism; and means operating coordinately with said nailing mechanism for cutting off said strap material during the next to the last operation of a series of operations comprising a strapping cycle of said nailing mechanism required for the strapping of a box.

8. The method of positioning strap material between box ends and nailing mechanism in a box strapping machine and then nailing said strap material to said box ends which comprises: providing said strapping material with a longitudinal corrugation rendering it capable of supporting horizontally, cantilever fashion, a length of said strap material longer than the upturned edges of one of said box ends; extending longitudinally a pair of such lengths, when so supported, between said box ends and said nailing mechanism; and operating said nailing mechanism to nail said strap lengths to the upturned edges of said box ends.

9. The method of positioning strap material between box ends and nailing mechanism in a box strapping machine and then nailing said strap material to said box ends which comprises: providing said strapping material with a longitudinal corrugation rendering it capable of supporting horizontally, cantilever fashion, a length of said strap material longer than the upturned edges of one of said box ends; extending longitudinally a pair of such lengths, when so supported, between said box ends and said nailing mechanism; guiding the front ends of said lengths of strap material on said nailing mechanism by upward engagement with the latter during said extension; and operating said nailing mechanism to nail said strap lengths to the upturned edges of said box ends.

10. The method of positioning strap material between box ends and nailing mechanism in a box strapping machine and then nailing said strap material to said box ends which comprises: providing said strapping material with a longitudinal rigidness rendering it capable of supporting horizontally cantilever fashion, a length of said strap material longer than an upturned edge of one of said box ends; extending a pair of such lengths of strap material, when so supported, between said box ends and said nailing mechanism; and operating said nailing mechanism to nail said strap lengths to the upturned edges of said box ends.

11. The method of positioning strap material between box ends and nailing mechanism in a box strapping machine and then nailing said strap material to said box ends which comprises: providing said strapping material with a longitudinal corrugation adapted to slidably mesh with and be guided by underfaces of said nailing mechanism, said corrugation also rendering said strapping material capable of supporting horizontally, cantilever fashion, a length of said strap material which is longer than the upturned edge of one of said box ends; extending a pair of such lengths, when so supported, between said box ends and said nailing mechanism; guiding the front ends of said lengths of strap material by tilting said front ends upwardly into engagement with said underfaces of said nailing mechanism; and operating said nailing mechanism to nail said strap lengths to the upturned edges of said box ends.

12. In a box strapping machine, the combination of: anvil means for supporting opposite ends of a box; nailing mechanism for simultaneously driving nails into corresponding edges of said box ends; means responsive to the operation of said nailing mechanism for feeding lengths of strap material into the spaces between said box ends and said nailing mechanism; and adjustable means for predetermining the positions the leading ends of said lengths of strap material are fed to in said feeding operation.

13. In a box strapping machine, the combination of: anvil means for supporting opposite ends of a box; nailing mechanism for simultaneously driving nails into corresponding edges of said box ends; means responsive to the operation of said nailing mechanism for feeding lengths of strap material from continuous rolls thereof into the spaces between said box ends and said nailing mechanism; adjustable means for predetermining the positions the leading ends of said lengths of strap material are fed to in said feeding operation; means permitting said strap material to be readily pulled through said feeding means after said feeding operation; means operating in timed relation with said nailing mechanism for cutting said strap material; and adjustable means for predetermining the points at which said lengths of strap material are cut from said rolls.

14. In a box strapping machine, the combination of: anvils for supporting opposite ends of a box; nailing mechanism including a pair of nailing units one of which is positioned over each of said box ends, and means for causing relative vertical movement between said anvils and units to drive nails into upwardly disposed edges of said box ends; means operating in timed relation with said nailing mechanism for feeding loose ends of continuous lengths of strap material into the spaces between said nailing units and upper edges of said box ends so that said loose ends extend beyond the front corners of said edges to form lapping portions of strap material; and means operating coordinately with said nailing units for bending said lapping portions around said front corners of said box ends when said nailing mechanism is operated to nail said strap material to said upturned edges.

15. In a box strapping machine, the combination of: anvils for supporting opposite ends of a box; nailing mechanism including a pair of nailing units one of which is positioned over each of said box ends, and means for causing relative vertical movement between said anvils and units to drive nails into upwardly disposed edges of said box ends; means operating in timed relation with said nailing mechanism for feeding loose ends of continuous lengths of strap material into the spaces between said nailing units and upper edges of said box ends so that said loose ends extend beyond the front corners of said edges to form lapping portions of strap material; and means operating coordinately with said nailing units for bending said lapping portions around said front corners of said box ends when said nailing mechanism is operated to nail said strap material to said upturned edges, said last mentioned means forming guides for said strap material during said feeding and nailing operations.

16. In a box strapping machine: means for supporting opposite ends of a box to be strapped; means for feeding lengths of strap material longitudinally along spaces disposed just above the ends of a box resting on said supporting means until lap portions of said lengths project beyond the position of the far corner of said box; and means operable when said box and strap lengths are thus disposed, to wrap said lap portions of said strap lengths downwardly about said box corner and nail said strap lengths to said box ends.

17. In a box strapping machine: means for supporting opposite ends of a box to be strapped; means for feeding lengths of strap material longitudinally along spaces disposed just above the ends of a box resting on said supporting means until lap portions of said lengths project beyond the position of the far corner of said box; and means operable when said box and strap lengths are thus disposed, to substantially simultaneously wrap said lap portions of said strap lengths downwardly about said box corners and nail said strap lengths to said box ends.

18. In a box strapping machine, the combination of: means for supporting a box with a strap extending over said box and beyond a given corner of said box; and means automatically operating upon said box to wrap over said corner the portion of said strap extending therebeyond and nail to said box the portion of said strap to which said outwardly extending portion is connected.

19. In a box strapping machine, the combination of: means for supporting a box in a given position with a length of strap material disposed over each of the end portions of said box, lap ends of said straps extending beyond a given corner of said box; and means operable through a unitary control to bend said overlap portions of strap about said corner and nail said strap lengths to said end portions of said box.

20. In a box strapping machine, the combination of: means for supporting a box in a given position, with pieces of strap material extending upwardly and inwardly over opposite corners of said box; and means for shaping said pieces of strap material snugly about said corners and nailing said strap material to said box inwardly from said corners.

21. In a box strapping machine, the combination of: means for supporting a box for a nailing operation to be performed thereon with a strap extending up a side of said box and over an upper corner of said box to overlie a portion of an upwardly disposed surface of said box; means operative when said box is moved into said position on said supporting means to shape said strap over said corner and in snug contact with the latter; and means for nailing said strap to said upwardly disposed surface of said box when the latter is so positioned on said support means.

22. In a box strapping machine, the combination of: means for supporting a box in position for performing a nailing operation thereon; a row of nail chucks disposed over said box for positioning nails to be driven into said box; a strap shaper for shaping a portion of strap material over a corner of said box; unitary means for supporting and lowering said nail chucks and shaper to perform their respective functions when a piece of strap material is disposed between said chucks, said shaper and said box; and means for driving nails from said chucks through said strap and into said box when said chucks and shaper are thus lowered.

23. In a box strapping machine, the combination of: means for supporting a box in position for performing a nailing operation thereon; a row of nail chucks disposed over said box for positioning nails to be driven into said box; a strap shaper for shaping a portion of strap material over a corner of said box; unitary means for supporting and lowering said nail chucks and shaper to perform their respective functions when a piece of strap material is disposed between said chucks, said shaper and said box; means for driving nails from said chucks through said strap and into said box when said chucks and shaper are thus lowered; means for guiding a piece of strap material when the latter is inserted longitudinally into the space beneath said chucks so as to maintain said piece of strap material under said chucks; means on the bottom of said shaper for guiding said strap when the latter extends therebeneath; and means for guiding said strap from contact with the bottom of said chucks and into contact with the bottom of said shaper, this last mentioned guide means yielding during the functioning of said shaper to permit the latter to shape said strap over said corner.

24. In a box strapping machine, the combination of: means for supporting a box in position to have a strap nailed thereto along a given line and with a piece of strap material extending cantilever fashion out over and above said box substantially opposite said line; nailing mechanism including a row of nail chucks adapted to move towards said box and drive nails into said box along said line; and means on said chucks for engaging said strap and properly positioning it in alignment with said line as said chucks move downwardly into nailing position.

25. A combination as in claim 24 in which said guide means comprise shoes on the bottoms of the nail chucks, which shoes mesh with and guide said strap as said shoes are lowered against said strap when said nail chucks move into nailing position.

26. In a box strapping machine the combination of: means for successively driving nails into end portions of four faces of said box in four nailing operations; means for feeding continuous lengths of strap material into positions which lie over said box end portions with initial free ends of said strap lengths extending beyond the upper front corner of the box, when the latter is placed in said machine; means responsive to the fourth nailing operation to actuate said feeding means; and automatic cut off means controlled by said first recited means to cut said strap lengths in timed relation with one of said nailing operations to leave terminal free ends of strap material extending away from said box and of suitable lengths to be nailed to said box by the one or more nailing operations remaining in the current series thereof.

27. In a box strapping machine, the combination of: means for successively driving nails into end portions of a plurality of faces of said box in a series of separate nailing operations equal in number to said faces; means for feeding continuous lengths of strap material into positions which lie over said box end portions with initial free ends of said strap lengths extending beyond the upper front corner of the box, when the latter is placed in said machine; means responsive to the final nailing operation in each series to actuate said feeding means; and automatic cut off means controlled by said first recited means to cut said strap lengths in timed relation with one of said nailing operations to leave terminal free ends of strap material extending away from said box and of suitable lengths to be nailed to said box by the one or more nailing operations remaining in the current series thereof.

28. In a box strapping machine, the combination of: means for successively driving nails into end portions of four faces of said box in four nailing operations; means for feeding continuous lengths of strap material into positions which lie over said box end portions with initial free ends of said strap lengths extending beyond the upper front corner of the box, when the latter is placed in said machine; means responsive to the fourth nailing operation to actuate said feeding means; and automatic cut off means controlled by said first recited means to cut said strap lengths in timed relation with one of said nailing operations to leave terminal free ends of strap material extending away from said box and of such lengths as to require at least two subsequent nailing operations to nail said terminal free strap ends to said box.

29. In a box strapping machine, the combination of: means for successively driving nails into end portions of a plurality of faces of said box in a series of separate nailing operations equal in number to said faces; means for feeding continuous lengths of strap material into positions which lie over said box end portions with initial free ends of said strap lengths extending beyond the upper front corner of the box, when the latter is placed in said machine; means responsive to the final nailing operation in each series to actuate said feeding means; and automatic cut off means controlled by said first recited means to cut said strap lengths in timed relation with one of said nailing operations to leave terminal free ends of strap material extending away from said box and of such lengths as to require at least two subsequent nailing operations to nail said terminal free strap ends to said box.

30. In combination: means for providing support on an upper level for ends of a box resting on said means with a given face of said box disposed upward; means for providing support on a lower level for said box ends with a different face of said box disposed upward; mechanism for properly presenting the aforesaid support means to permit them to function successively in supporting said box to locate the upwardly disposed face of said box in each instance substantially upon the same working level; a pair of stops adapted to be contacted by an upper rear portion of said box when supported from said lower level; and means actuated by said mechanism for automatically positioning said stops in the horizontal path of said box to be contacted by said box when the latter is pushed rearwardly while supported from said lower level, said means automatically responding to said mechanism to withdraw said stops from said horizontal path when said support means are presented for supporting said box from said upper level.

31. In a box strapping machine, the combination of: nailing mechanism; means for causing said nailing mechanism to operate to perform a cycle of nailing operations, each operation being performed separately; means for supporting a box to receive nails from said nailing mechanism during each of said nailing operations in a different face of said box; means for feeding a free end of a continuous length of strap material into place to be nailed to said box during the first of said nailing operations; means for providing adequate slack in said strap material to permit the easy repositioning of said box for each of the succeeding nailing operations; and means for actuating said slack producing means by said nailing means.

32. In a box strapping machine, the combination of: means for successively driving nails into end portions of a plurality of faces of said box in a series of separate nailing operations equal in number to said faces; means for feeding continuous lengths of strap material into positions which lie over said box end portions when the box is placed in said machine; means responsive to the final nailing operation in each series to actuate said feeding means; and automatic cut off means controlled by said first recited means to cut said strap lengths in timed relation with one of said nailing operations to leave terminal free ends of strap material extending away from said box and of suitable lengths to be nailed to said box by the one or more nailing operations remaining in the current series thereof.

33. In a box strapping machine, the combination of: means for supporting a box in position to have a strap nailed along a given line, a piece of strap material being disposed relatively loosely over said box substantially opposite said line; nailing mechanism adapted to move toward said box to nail said strap material to said box; and means operating coordinately with said nailing mechanism to engage and centralize said strap material relative to said line.

34. In a box strapping machine, the combination of: means for supporting a box in position to have a strap nailed along a given line, a piece of strap material being disposed relatively loosely over said box substantially opposite said line; nailing mechanism adapted to move toward said box to nail said strap material to said box; and means yieldably supported on said nailing mechanism and operating coordinately with said nailing mechanism to engage and centralize said strap material relative to said line.

35. In a box strapping machine, the combination of: means for supporting a box in position to have a strap nailed along a given line, a piece of strap material being disposed relatively loosely over said box substantially opposite said line; nailing mechanism adapted to move toward said box to nail said strap material to said box; and means slidably mounted on said nailing mechanism and operating coordinately with said nailing mechanism to engage and centralize said strap material relative to said line.

36. In a box strapping machine, the combination of: means for supporting a box in position to have a strap nailed along a given line, a piece of strap material being disposed relatively loosely over said box substantially opposite said line; nailing mechanism adapted to move toward said box to nail said strap material to said box; and jaw means operable by said nailing mechanism and converging on said strap material to centralize said strap material relative to said line just prior to the nailing of said strap to said box by said nailing mechanism.

37. In a box strapping machine, the combination of: means for supporting a box in position to have a strap nailed along a given line, a piece of strap material being disposed relatively loosely over said box substantially opposite said line; nailing mechanism adapted to move toward said box to nail said strap material to said box; centralizing means shiftably mounted on said nailing mechanism, said centralizing means contacting said box as said nailing mechanism approaches the latter thus causing relative movement between said nailing mechanism and said centralizing means; and means on said centralizing means and operated by said relative movement to shift said strap across its length to centralize said strap relative to said line.

38. In a box strapping machine, the combination of: means for feeding strap material across a box to extend beyond said box; means for nailing said strap to said box to leave said extending portion of said strap extending freely from the strap material nailed to said box; and anvil means for supporting said box during nailing operations, said anvil means supporting said box elsewhere than through said extending strap portion during a subsequent nailing operation when said strap portion is disposed beneath said box.

39. In a box strapping machine, the combination of: means for feeding strap material across a box to extend beyond said box; means for nailing said strap to said box to leave said extending portion of said strap extending freely from the strap material nailed to said box; anvil means for supporting said box during nailing operations, said anvil means supporting said box elsewhere than through said extending strap portion during a subsequent nailing operation when said strap portion is disposed beneath said box; and an inclined ramp on said anvil means for guiding said extending strap portion into place on said anvil means with said strap portion disposed beneath said box.

40. In a box strapping machine, the combination of: means for feeding strap material across a box to extend beyond said box; means for nailing said strap to said box to leave said extending portion of said strap extending freely from the strap material nailed to said box; anvil means for supporting said box during the nailing operations thereon; and a detachable box support adapted to be attached to said anvil means to support said box for nailing operations when said extended strap portion is disposed beneath said box without transmitting the pressure of said nailing operation to said strap portion.

41. In a box strapping machine for simultaneously strapping opposite ends of boxes of various lengths, the combination of: means for supporting any of said boxes; means associated with said box supporting means and adaptable to operate simultaneously on both ends of any of said boxes so supported to apply strap material to said box substantially in the plane of each of said ends; means for supplying two pieces of strap material to opposite ends of said box so that said pieces of material lie in the planes in which they are to be applied to said box; means operating said strap supplying and said strap applying means in timed relation to cause the latter means to apply said material to said box as aforesaid; and means for varying the spaced relation of said two pieces of strap material supplied as aforesaid, to properly relate said strap material to boxes of various lengths.

42. In a box strapping machine for simultaneously strapping opposite ends of boxes of various lengths, the combination of: means for supporting any of said boxes; means associated with said box supporting means and adaptable to operate simultaneously on both ends of any of said boxes so supported to apply strap material to said box substantially in the plane of each of said ends; means for supplying two pieces of strap material to opposite ends of said box so that said pieces of material lie in the planes in which they are to be applied to said box; means operating said strap supplying and said strap applying means in timed relation to cause the latter means to apply said material to said box as aforesaid; and means for adjusting said strap material supplying means to enable said supplying means to supply said pieces of strap in proper relation to be applied as aforesaid to boxes of various lengths.

43. In a box strapping machine for simultaneously strapping opposite ends of boxes of various lengths, the combination of: means for supporting any of said boxes; means associated with said box supporting means and adaptable to operate simultaneously on both ends of any of said boxes so supported to apply strap material to said box substantially in the plane of each of said ends; a pair of spaced strap supplying means, each of said supplying means feeding a piece of strap to one end of said box so that said strap lies in said plane of one of said box ends; means for operating said strap applying means to cause the latter means to apply said strap material to said box as aforesaid; and means for varying the distance between said spaced strap supplying means to properly relate said strap material with boxes of various lengths.

44. In a box strapping machine for simultaneously strapping opposite ends of boxes of various lengths, the combination of: means for supporting any of said boxes; means associated with said supporting means and adaptable to operate simultaneously on both ends of any of said boxes so supported to apply strap material to said box substantially in the plane of each of said ends; a pair of spaced strap supplying units, said units supplying two pieces of strap material to opposite ends of said box so that said pieces of material lie in said planes, each of said strap supplying units including strap feeding means, strap cutting means, and strap guiding means, said units being mounted to enable changing the spaced relation thereof to enable said units to supply said pieces of strap material in the aforesaid relation to boxes of various lengths; and means for actuating said strap applying means to apply said pieces of strap to said box.

45. In a box strapping machine for simultaneously strapping opposite ends of boxes of various lengths, the combination of: anvil means for supporting ends of said boxes; fastener inserting means associated with said anvil means and adaptable to operate simultaneously on both ends of any of said boxes so supported; means for supplying two pieces of strap material between said fastener inserting means and a box supported on said anvil means with said pieces of strap material lying in the planes of the ends of said box; means operating said strap supplying means and said fastener inserting means in timed relation to cause the latter means to fasten said material to said box; and means for varying the spaced relation of said two pieces of strap material supplied as aforesaid to properly relate said strap material to boxes of various lengths.

46. In a box strapping machine, the combination of: box supporting means; power means for gripping and feeding two straps a predetermined distance over a box supported on said supporting means, said straps when so fed being positioned substantially in the planes of the ends of said box; means for simultaneously securing said straps to corresponding edges of said box ends; and automatic means operable in timed relation with said strap securing means for causing said power strap feeding means to release said straps following said securing operation to allow said straps to be freely drawn through said feeding means.

47. In a box strapping machine, the combination of: box supporting means; power means for gripping and feeding two straps a predetermined distance over a box on said supporting means, said straps, when so fed, being positioned substantially in the planes of the ends of said box; means for simultaneously securing said straps to corresponding edges of said box ends; cut-off means disposed between said power feeding means and said securing means for cutting said straps; and automatic control means operable in timed relation with said strap securing means for causing said gripping and feeding means to release said straps following said securing operation to allow said straps to be freely drawn through said feeding means and to again grip said straps prior to said cutting operation.

48. In a box strapping machine, the combination of: a reel for supporting a continuous length of strap material; means for applying a portion of said strap material to a box; means for feeding said strap material to said strap applying means following said strap applying operation; and means operable during said strap applying operation and between strap feeding operations for providing between said reel and said feeding means a quantity of slack strap material which is substantially free of tension to facilitate the feeding of said strap to said strap applying means in the next feeding operation.

49. In a box strapping machine, the combination of: a reel for supporting a continuous length of strap material; nailing means for nailing a portion of said strap material to a box in successive nailing operations; means for feeding said strap material to said nailing means prior to the first of said successive nailing operations; means rendering said feeding means inoperative after said first nailing operation to permit said strap to be drawn freely through said feeding means prior to each of said successive nailing operations; and means for providing a tension-free, slack portion of said strap material between said reel and said nailing means following each nailing operation to facilitate drawing said strap material through said feeding means.

50. In a box strapping machine, the combination of: box supporting means; nailing means; means for feeding the end portion of a continuous length of strap into position between said nailing means and a box disposed on said box supporting means, said nailing means securing said strap to a plurality of faces of said box in successive nailing operations; and strap cut-off means operable automatically for cutting said strap material prior to the last of said nailing operations to leave a terminal end portion of strap extending away from said box, said end portion being of suitable length to complete the strapping of said box, said cut-off means being adjustable toward and away from said box to enable varying the length of said terminal end portion of said strap.

GERALD C. PAXTON.